(12) United States Patent
Pacella et al.

(10) Patent No.: US 8,725,837 B2
(45) Date of Patent: May 13, 2014

(54) CONTENT AWARENESS CACHING WITH NETWORK-AWARE GEO-LOCATION PROTOCOL

(75) Inventors: Dante J. Pacella, Charles Town, WV (US); Harold J. Schiller, Silver Springs, MD (US); Mark D. Carney, Sterling, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 296 days.

(21) Appl. No.: 12/961,617

(22) Filed: Dec. 7, 2010

(65) Prior Publication Data

US 2011/0078287 A1    Mar. 31, 2011

Related U.S. Application Data

(63) Continuation-in-part of application No. 12/481,951, filed on Jun. 10, 2009.

(51) Int. Cl.
    *G06F 15/16*    (2006.01)
(52) U.S. Cl.
    USPC .............................. 709/218; 709/219; 725/86

(58) Field of Classification Search
    None
    See application file for complete search history.

(56) References Cited

U.S. PATENT DOCUMENTS

| | | | |
|---|---|---|---|
| 6,594,699 B1 * | 7/2003 | Sahai et al. | 709/228 |
| 2002/0083148 A1 * | 6/2002 | Shaw et al. | 709/214 |
| 2005/0195949 A1 | 9/2005 | Frattura | |
| 2008/0201225 A1 | 8/2008 | Maharajh et al. | |
| 2008/0215720 A1 | 9/2008 | Westin | |
| 2009/0006211 A1 | 1/2009 | Perry et al. | |
| 2009/0210549 A1 * | 8/2009 | Hudson et al. | 709/231 |
| 2010/0017815 A1 * | 1/2010 | Mas Ivars et al. | 725/14 |
| 2010/0220700 A1 | 9/2010 | Hodro et al. | |
| 2011/0105144 A1 | 5/2011 | Siomina et al. | |

* cited by examiner

Primary Examiner — Ario Etienne
Assistant Examiner — Clayton R Williams

(57) ABSTRACT

A device receives subscriber information associated with user devices provided in a network, receives network information associated with the network, and receives user device information associated with the user devices. The device also determines content to cache based on the received information, and requests the determined content from a content provider device. The device further receives the determined content from the content provider device, and stores the determined content in a cache device.

18 Claims, 18 Drawing Sheets

FIG. 6

| Registration Information | Net./UD Attach. Pt. | UD Type | UD Speed | UD Zip Code | UD Location | Provider Load | Other Info. |
|---|---|---|---|---|---|---|---|
| User1 Reg. Info. | Attachment Point1 | Cell Phone | Speed1 | 99999 | NY, NY | Bandwidth1 | *** |
| User2 Reg. Info. | Attachment Point2 | STB | Speed2 | 88888 | Phila., PA | Bandwidth2 | *** |
| User3 Reg. Info. | Attachment Point3 | Laptop | Speed3 | 77777 | Wilm., DE | Bandwidth3 | *** |

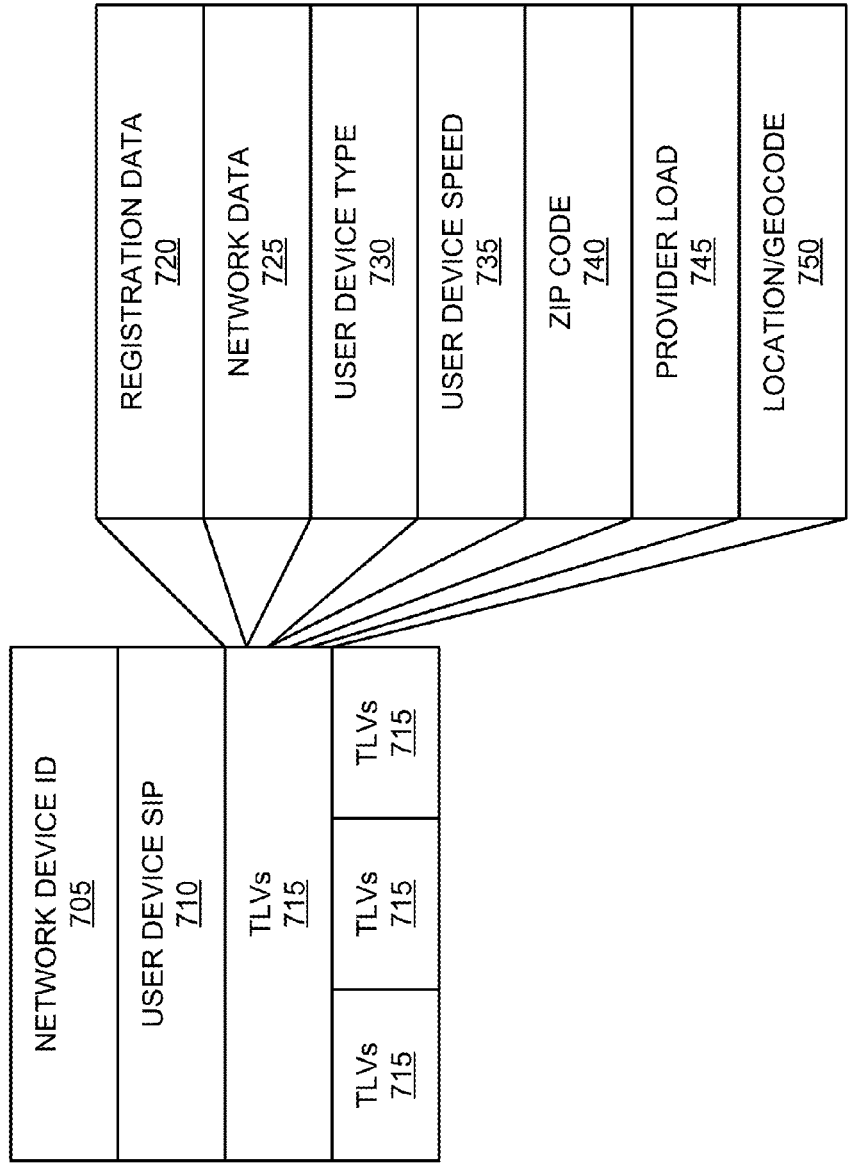

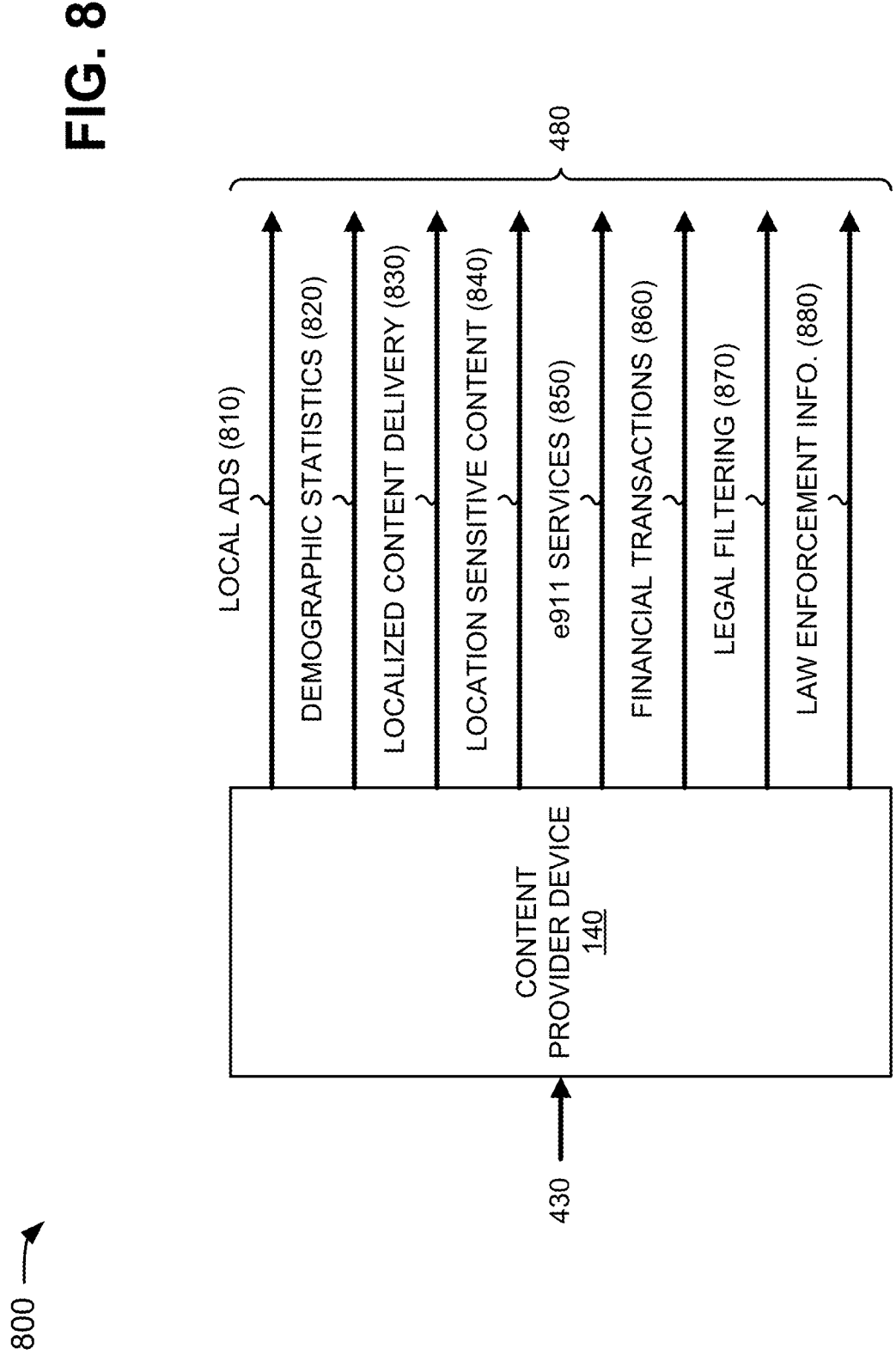

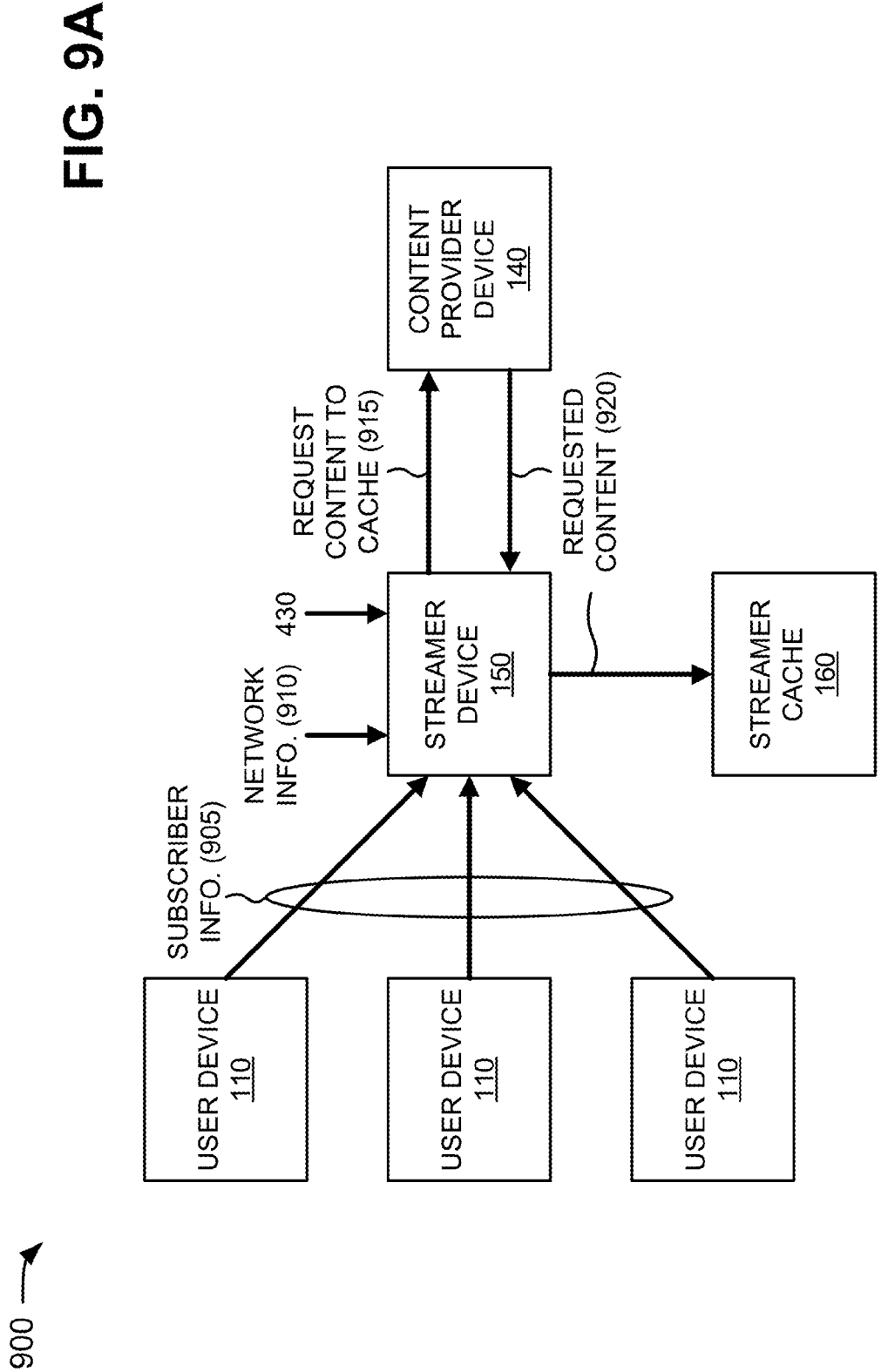

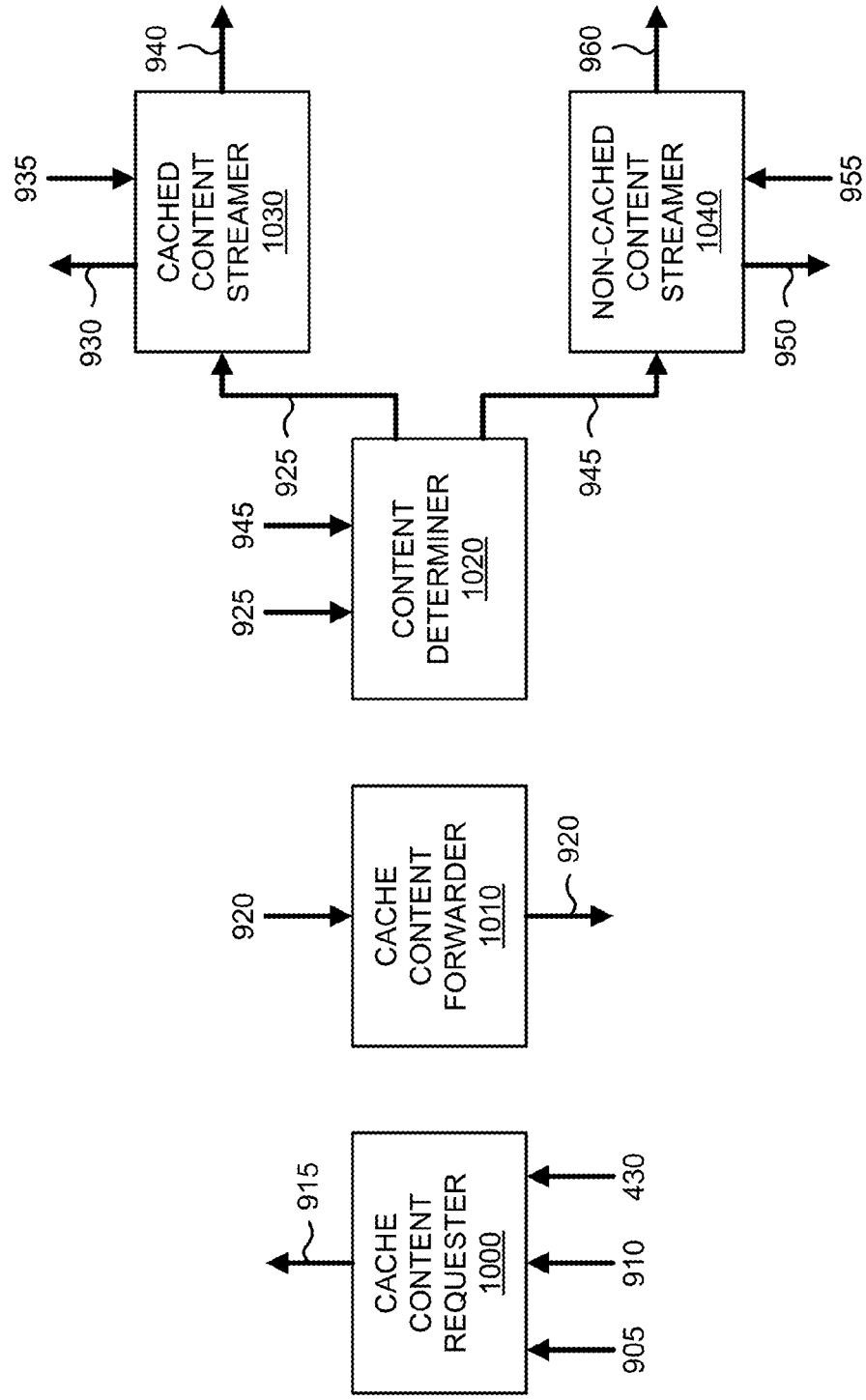

FIG. 11

| Subscriber Info. | Subscriber Interests | Link Perform. | UD Capabilities | Player Type | Encoding | Video Format | Player File Format |
|---|---|---|---|---|---|---|---|
| Name | Action Movies | B/W | HD | Player Type1 | MPEG | Resolution | iPod |
| Demo. | Rock Music | Speed1 | Screen Size | Player Type2 | WMV | Bit Rate | PS3 |
| Address | Educational Television | Speed2 | 3D | Player Type3 | MP3 | Color Model | DROID |

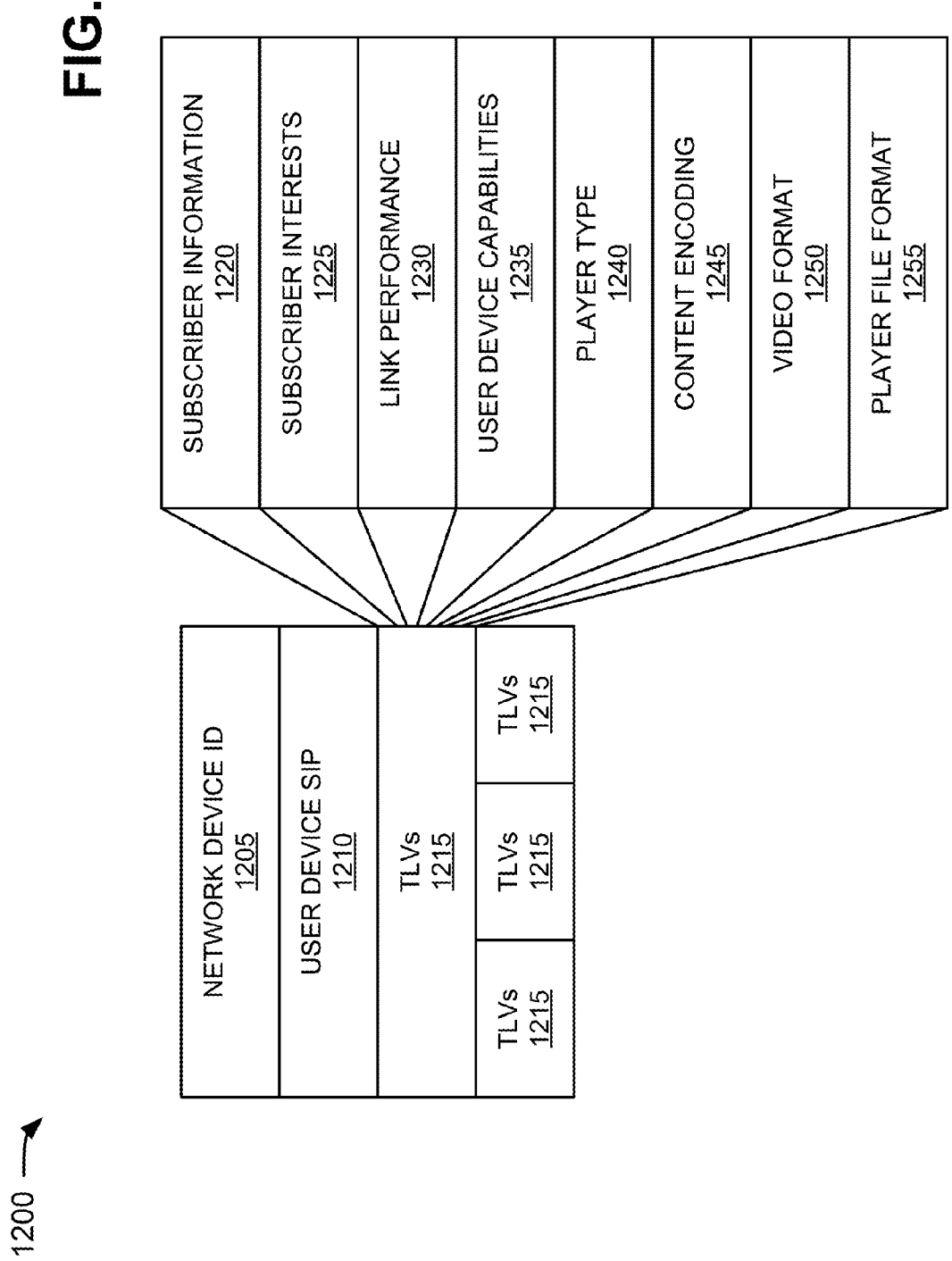

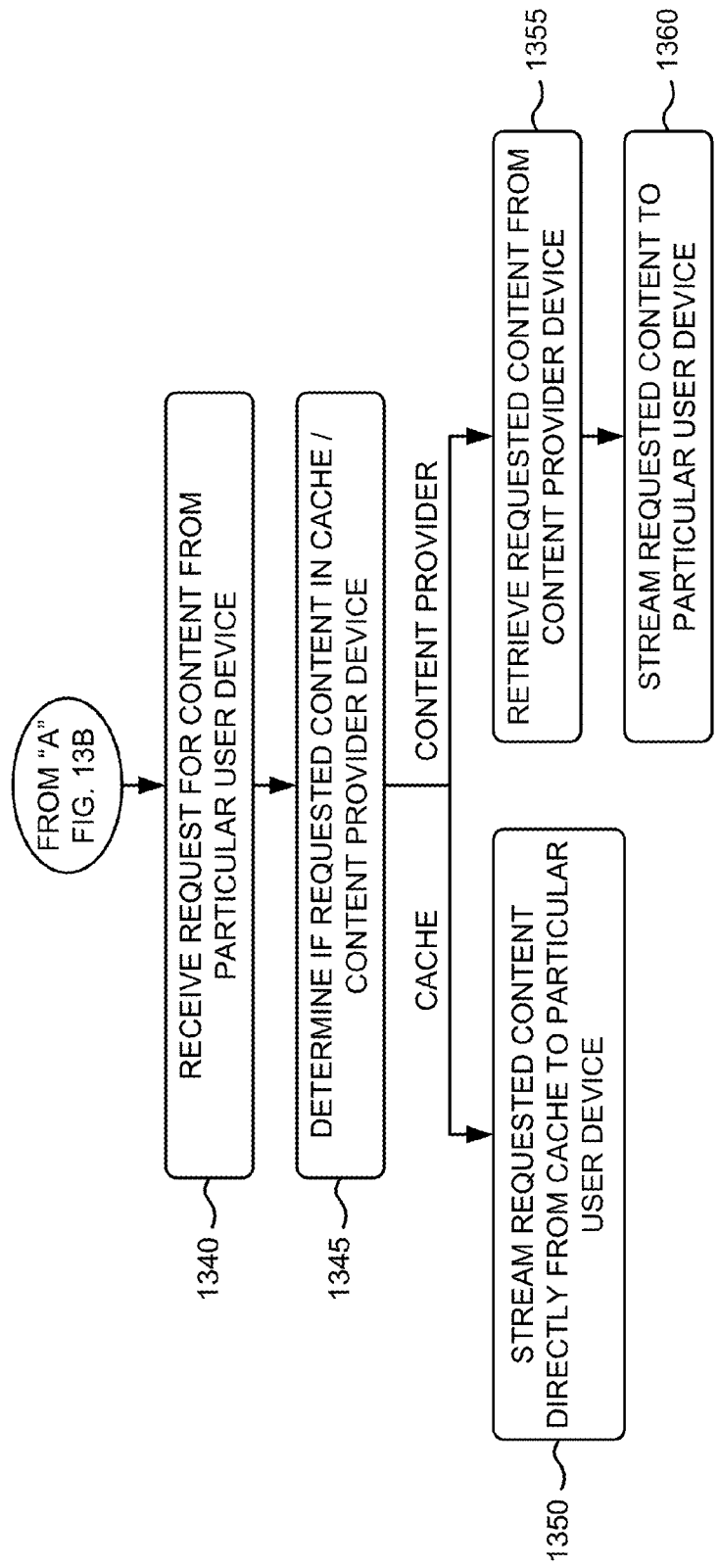

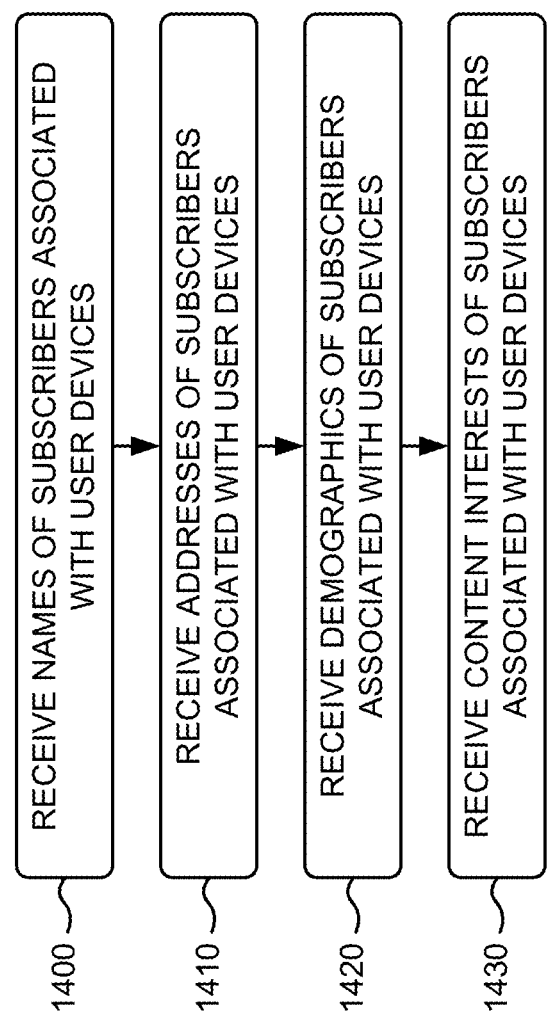

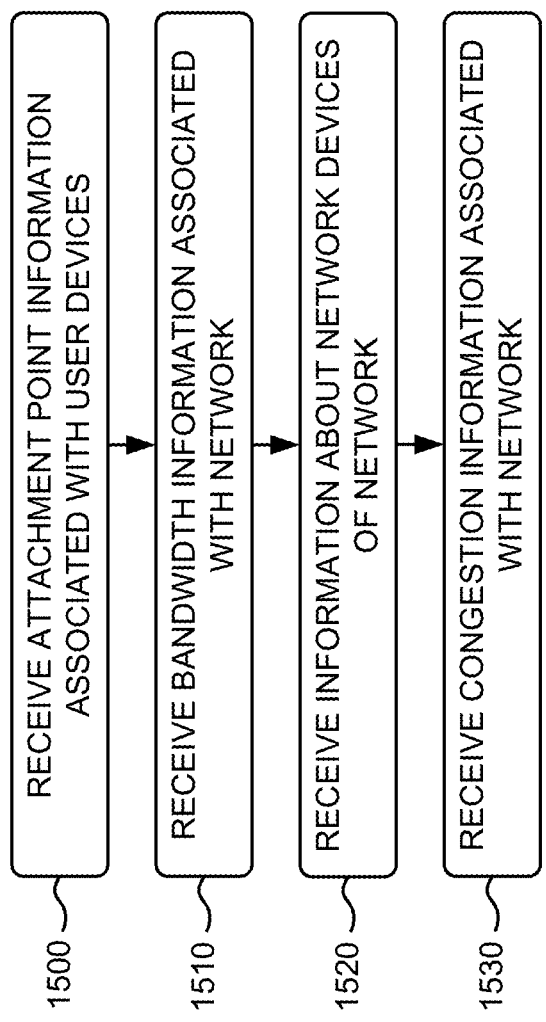

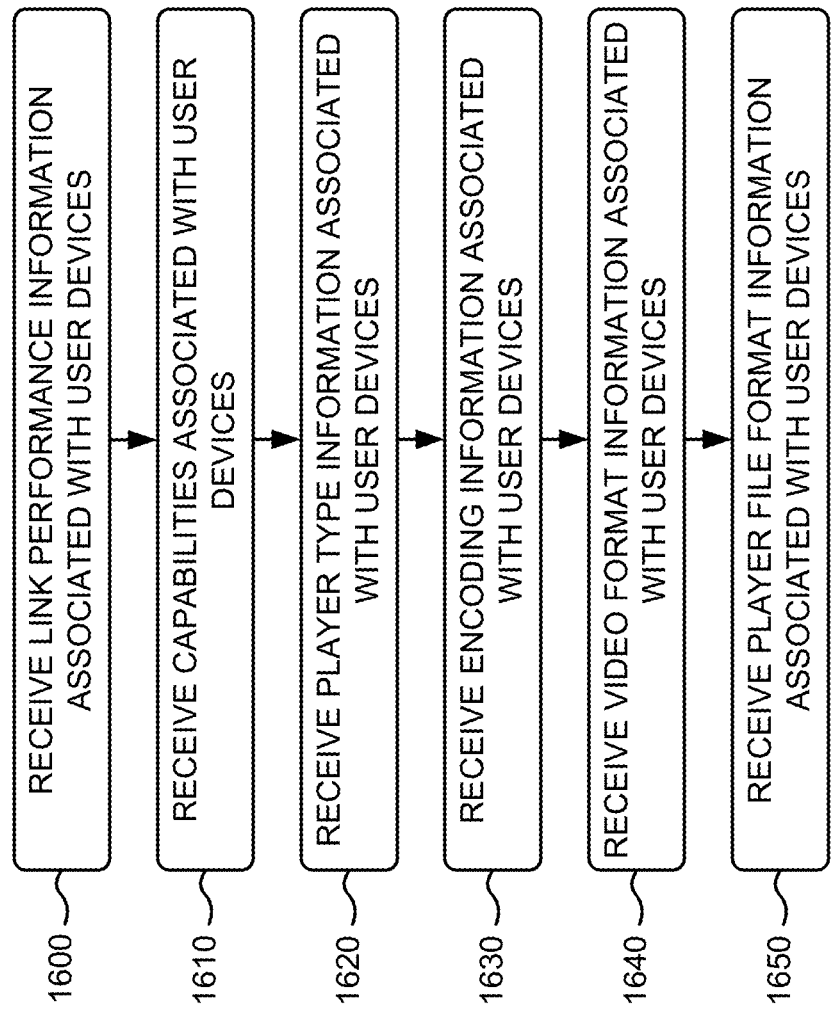

US 8,725,837 B2

CONTENT AWARENESS CACHING WITH NETWORK-AWARE GEO-LOCATION PROTOCOL

RELATED APPLICATION

This application is a continuation-in-part of U.S. patent application Ser. No. 12/481,951, filed Jun. 10, 2009, the entire content of which is hereby incorporated by reference.

BACKGROUND

In networks (e.g., Internet protocol (IP)-based networks, telecommunications networks, etc.), a significant amount of effort is expended trying to identify a physical location (e.g., a geographical location or "geo-location") of an end user device (e.g., a mobile telephone, a set-top box (STB), a laptop computer, etc.) connected to the network. Some rudimentary services can identify the physical locations of end user devices. For example, a weather channel may target advertisements based on a perceived location of a user (e.g., of an end user device, such as an STB).

Some networks (e.g., a content delivery network (CDN)) enable content to be retrieved from content distribution libraries. The content distribution libraries are typically large due to, for example, providing different encodings for the same content, which results in hundreds or even thousands of different files for the same content. For example, file encoding formats for a given movie title could include encoding for Moving Picture Experts Group (MPEG)-4/H.264, MPEG-2/H.263, various screen formats (e.g., for smart phones, laptop computers, televisions, tablet computers, etc.), etc. This can lead to hundreds of discrete files with thousands of data chunks for distribution in a CDN topology, which can significantly degrade the effectiveness of the CDN.

BRIEF DESCRIPTION OF THE DRAWINGS

FIG. 6 is a diagram of an example portion of a database depicted in FIG. 1;

FIG. 7 is a diagram of example elements of a datagram capable of being utilized in the network illustrated in FIG. 1;

FIG. 8 is a diagram of example content that may be generated by the content provider device depicted in FIG. 1;

FIGS. 9A and 9B are diagrams of example interactions among components of another example portion of the network depicted in FIG. 1;

FIG. 10 is a diagram of example functional components of a streamer device depicted in FIG. 1;

FIG. 11 is a diagram of an example portion of a database capable of being generated and/or maintained by the streamer device of FIG. 1;

FIG. 12 is a diagram of example elements of another datagram capable of being utilized in the network of FIG. 1; and FIGS. 13A-16 are flow charts of an example process for providing content awareness caching according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide content awareness caching with a network-aware geo-location protocol (e.g., referred to herein as a "postmark protocol"). The systems and/or methods may determine which portions of content should be stored in a cache (e.g., physically located near customer user devices, such as mobile telephones, STBs, etc.), and may prevent distributing or streaming high rate encoded content on congested portions of a network. The systems and/or methods may provide an intelligent method for caching content so that content with the most common encoding and/or player formats (e.g., desired by customers) are cached near user devices, rather than content with the least desired encoding and/or player formats.

In one example implementation, the systems and/or methods may receive subscriber information associated with user devices in a network, may receive information associated with the network, and may receive information associated with the user devices. The systems and/or methods may determine content to cache based on the received information, and may request the determined content from a content provider. The systems and/or methods may receive the determined content from the content provider, and may store the determined content in a cache. The systems and/or methods may receive a request for content from a particular user device, and may determine if the requested content is in the cache or at the content provider. If the requested content is in the cache, the systems and/or methods may stream the requested content directly from the cache to the particular user device. If the requested content is at the content provider, the systems and/or methods may retrieve the requested content from the content provider, and may stream the retrieved, requested content to the particular user device.

As used herein, the terms "subscriber," "customer," and/or "user" may be used interchangeably. Also, the terms "subscriber," "customer," and/or "user" are intended to be broadly interpreted to include a user device or a user of a user device.

As used herein, the term "postmark protocol" is intended to be broadly interpreted to include a network transmission protocol that enables a physical (e.g., geographical) location of a user device (e.g., connected to the network); subscriber information; subscriber content interests; link performance; user device capabilities; content player type information (e.g., of user devices); encoding used by user devices; video formats used by user device; and/or content player file formats to be ascertained.

Figure 1:
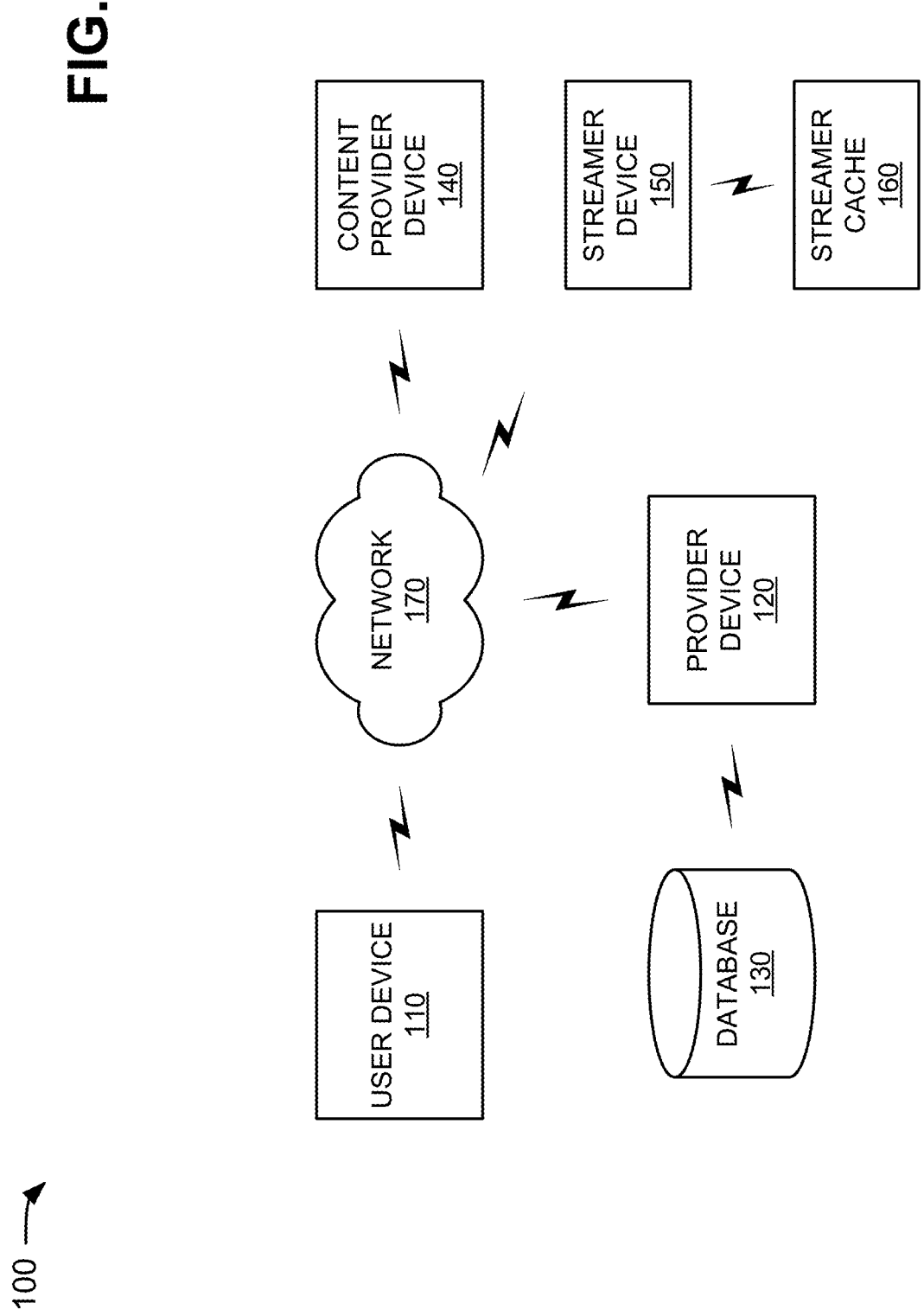
FIG. 1 is a diagram of an example network in which systems and/or methods described herein may be implemented.

FIG. 1 is a diagram of an example network 100 in which systems and/or methods described herein may be implemented. As shown, network 100 may include a user device 110, a provider device 120, a database 130, a content provider device 140, a streamer device 150, and a streamer cache 160 interconnected by a network 170. Components of network 100 may interconnect via wired and/or wireless connections. A single user device 110, provider device 120, database 130, content provider device 140, streamer device 150, streamer cache 160, and network 170 have been illustrated in FIG. 1 for simplicity. In practice, there may be more user devices 110, provider devices 120, databases 130, content provider devices 140, streamer devices 150, streamer caches 160, and/or networks 170. Also, in some instances, a component of network 100 may perform one or more functions described as being performed by another component or group of components of network 100.

User device 110 may include a radiotelephone, a personal communications system (PCS) terminal (e.g., that may combine a cellular radiotelephone with data processing and data communications capabilities), a STB, a PDA (e.g., that can include a radiotelephone, a pager, Internet/intranet access, etc.), a laptop computer, a personal computer, a smart phone, smart televisions, or other types of computation and/or communication devices. In one implementation, user device 110 may include any device (e.g., an Internet Protocol (IP)-based device) that enables a user to access the Internet and/or communicate with provider device 120, content provider device 140, and/or streamer device 150 via network 170.

In another example implementation, user device 110 may include a player that plays streaming content (e.g., content that continuously plays early in a download process without requiring a complete download in order to play content). The player may be imbedded in other applications, such as a web browser or may be offered as a standalone device or application interface in a multi-purpose user device 110, such as a computer or a smart phone. The player may include software or hardware controls for playback, stop, pause, rewind, fast forward, etc.

Content may include a particular encoding, such as audio encoding, video encoding, or another form of file compression. The encoded content may be decoded by user device 110 (e.g., by the player) in real time or pseudo-real time (e.g., with a small delay for buffering and/or re-sequencing). For example, audio encoding may include OGG, MPEG Layer 3 (MP3), Advanced Audio Coding (AAC), etc. For example, video encoding may include MPEG (e.g., multiple versions such H.264 and DivX), Windows Media Video (WMV), etc. As used herein, the terms "encoding" and "encoded" may refer to a method to compress content (e.g., a codec), rather than to screen or player formatting (which may be operational parameters for the encoding method).

User device 110 (e.g., the player) may employ a video format to play back a particular encoding method (e.g., codec). Parameters for the video format may include a display resolution (e.g., 480, 720, 1080, etc. resolution); an aspect resolution (e.g., 16:9, 3:2, etc.); interlacing (e.g., a parameter that describes an image refresh method, whether per line or alternating lines); a frame rate (e.g., 20-120 frames per second (fps), 24-60 fps, etc.); a color model (e.g., YPbPr (or component), YUV (or composite), etc.); a bit rate (e.g., a streaming rate across an IP network that can be transported via a Transmission Control Protocol (TCP) or a User Datagram Protocol (UDP)); etc. User device 110 (e.g., the player) may also employ a player file format (e.g., an iPod™ format, a PS3™ format, etc.) that combines an encoding method with one or more video format parameters.

Provider device 120 may include one or more server devices, or other types of computation or communication devices, that gather, process, search, and/or provide information in a manner described herein. Provider device 120 may be associated with a provider that owns and/or manages provider device 120, database 130, streamer device 150, streamer cache 160, and/or network 170 (or a portion of network 170). In one implementation, provider device 120 may receive a connection by user device 110, and may provide connection information (e.g., network attachment point data, user device 110 attachment point data, etc.) associated with user device 110 to database 130. Provider device 120 may receive, from database 130, information (e.g., geo-location information, etc.) associated with user device 110 based on the connection information, and may receive a trigger instructing provider device 120 to provide the user device information to content provider device 140. When the trigger is received, provider device 120 may verify a content provider associated with content provider device 140, and may provide the user device information to content provider device 140 when the content provider is verified.

Database 130 may include one or more storage devices that may store information received by and/or provided to provider device 120. In one implementation, database 130 may store information described below in connection with, for example, FIG. 6. For example, database 130 may store registration information (e.g., user name, address, etc.) associated with user device 110, type information (e.g., make, model, etc.) associated with user device 110, speed information (e.g., in gigabits per second) associated with user device 110, load information (e.g., bandwidth) associated with provider device 120, etc. Although FIG. 1 shows database 130 as separate from provider device 120, in other implementations, database 130 may be incorporated in provider device 120.

Content provider device 140 may include one or more server devices, or other types of computation or communication devices, that gather, process, search, and/or provide information in a manner described herein. Content provider device 140 may be associated with a third party content provider that is not associated with (e.g., owns and/or manages) provider device 120, database 130, streamer device 150, streamer cache 160, and/or network 170. In one implementation, content provider device 140 may receive, from provider device 120, information (e.g., geo-location information, etc.) associated with user device 110. Based on the information associated with user device 110, content provider device 140 may provide advertisements and/or content localized for user device 110, may calculate demographic statistics, may redirect content delivery to a specific local content, may restrict financial transactions to a specific location, may prevent content delivery to illegal locations, and/or may provide, to law enforcement or emergency services agencies (or entities), a location of user device 110.

Streamer device 150 may include one or more server devices, or other types of computation or communication devices, that gather, process, search, and/or provide information in a manner described herein. In one example, streamer device 150 may be incorporated in provider device 120 or may be separate from provider device 120 (e.g., as shown in FIG. 1). In one example, streamer device 150 may retrieve non-cached content from content provider device 140 and may transmit (e.g., to user device 110) the non-cached content in an active stream that attempts to continuously play early in a download process (e.g., not requiring a complete file download in order to play the content). In another example, streamer device 150 may directly transmit cached content from streamer cache 160 to user device in an active stream.

In one example implementation, streamer device 150 may receive subscriber information (e.g., subscriber names, content preferences, etc.) associated with user devices 110 in network 100, may receive information associated with network 100 (e.g., information about network devices and links of network 170 used to connect user devices 110 to streamer device 150), and may receive information associated with user devices 110 (e.g., players implemented by user devices 110, content encoding used by user devices 110, etc.). Streamer device 150 may store the received information in a database (e.g., the database described below in connection with FIG. 11) provided in or maintained by streamer device

150. Streamer device 150 may determine content to cache based on the received information, and may request the determined content from content provider device 140. Streamer device 150 may receive the determined content from content provider device 140, and may store the determined content in streamer cache 160. In one example, streamer device 150 may store (e.g., in streamer cache 160 and physically near user devices 110) content with the most common encoding and/or player formats (e.g., desired by user devices 110), rather than content with the least desired encoding and/or player formats. Such an arrangement may ensure that content with the most common encoding and/or player formats may be quickly and easily streamed to user devices 110 (e.g., without having to retrieve the content from content provider device 140).

In another example implementation, streamer device 150 may receive a request for content from a particular user device 110, and may determine if the requested content is in streamer cache 160 or at content provider device 140. If the requested content is in streamer cache 160, streamer device 150 may stream the requested content directly from streamer cache 150 to the particular user device 110. If the requested content is at content provider device 140, streamer device 150 may retrieve the requested content from content provider device 140, and may stream the retrieved, requested content to the particular user device 110.

Streamer cache 160 may include one or more storage devices that may store information (e.g., cached content) to be streamed by streamer device 150 to user devices 110. In one example implementation, streamer cache 160 may store content that streamer device 150 determined to be cached based on the subscriber information, the network information, and the user device information. For example, streamer cache 160 may store content with the most common encoding and/or player formats (e.g., desired by user devices 110), rather than content with the least desired encoding and/or player formats. This may ensure that content with the most common encoding and/or player formats may be quickly and easily streamed to user devices 110 (e.g., without having to retrieve the content from content provider device 140). Although FIG. 1 shows streamer cache 160 as separate from streamer device 150, in other implementations, streamer cache 160 may be incorporated in streamer device 150. In still other implementations, streamer cache 160 may be incorporated in provider device 120 and/or database 130.

Network 170 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a session initiation protocol (SIP)-based network, or a combination of networks. In one implementation, network 170 may include one or more network devices (e.g., routers, gateways, switches, network interface cards (NICs), hubs, a bridges, etc.) that may route information (e.g., datagrams) to and/or from user device 110, provider device 120, database 130, content provider device 140, streamer device 150, and/or streamer cache 160. A "datagram(s)" may include any type or form of data, such as packet or non-packet data.

Figure 2:
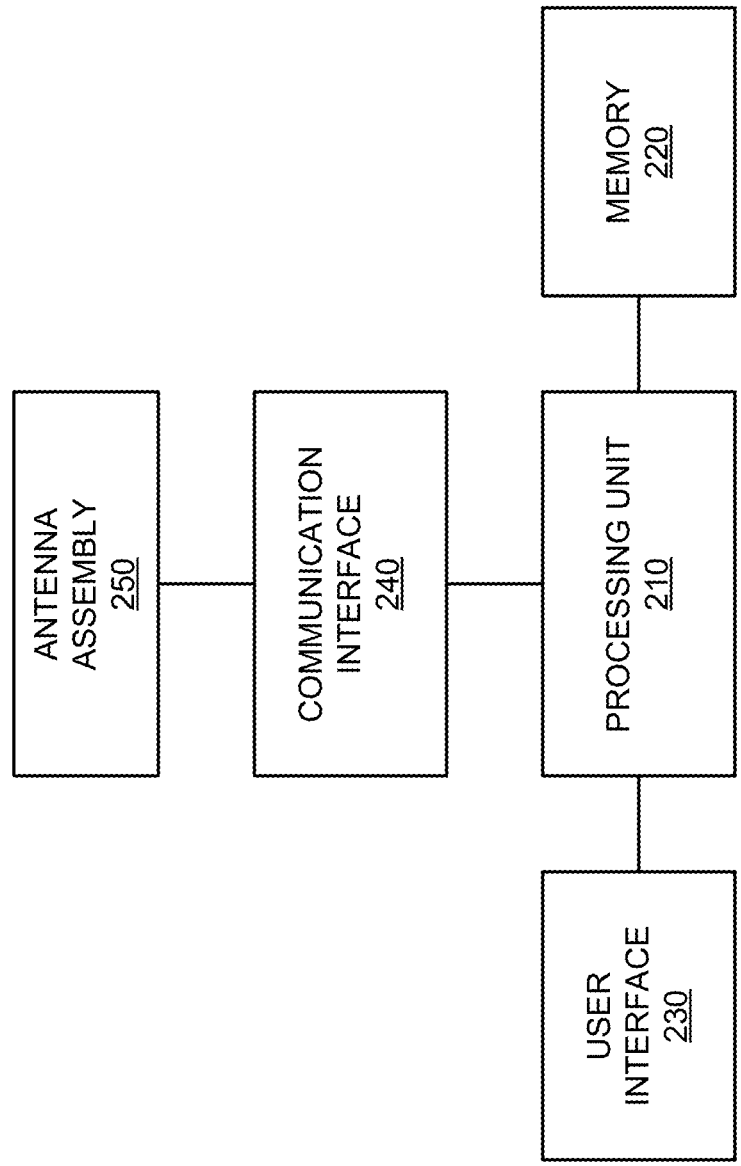
FIG. 2 is a diagram of example components of a user device depicted in FIG. 1.

FIG. 2 is a diagram of example components of a device 200 that may correspond to user device 110. As illustrated, device 200 may include a processing unit 210, memory 220, a user interface 230, a communication interface 240, and/or an antenna assembly 250.

Processing unit 210 may include one or more processors, microprocessors, application-specific integrated circuits (ASICs), field-programmable gate arrays (FPGAs), or the like. Processing unit 210 may control operation of device 200 and its components. In one implementation, processing unit 210 may control operation of components of device 200 in a manner described herein.

Memory 220 may include a random access memory (RAM), a read-only memory (ROM), and/or another type of memory to store data and instructions that may be used by processing unit 210.

User interface 230 may include mechanisms for inputting information to device 200 and/or for outputting information from device 200. Examples of input and output mechanisms might include buttons (e.g., control buttons, keys of a keypad, a joystick, etc.) or a touch screen interface to permit data and control commands to be input into device 200; a speaker to receive electrical signals and output audio signals; a microphone to receive audio signals and output electrical signals; a display to output visual information (e.g., text input into device 200); a vibrator to cause device 200 to vibrate; etc.

Communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air, and receive RF signals over the air and provide them to communication interface 240. In one implementation, for example, communication interface 240 may communicate with a network (e.g., network 170) and/or devices connected to a network.

As will be described in detail below, device 200 may perform certain operations described herein in response to processing unit 210 executing software instructions of an application contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
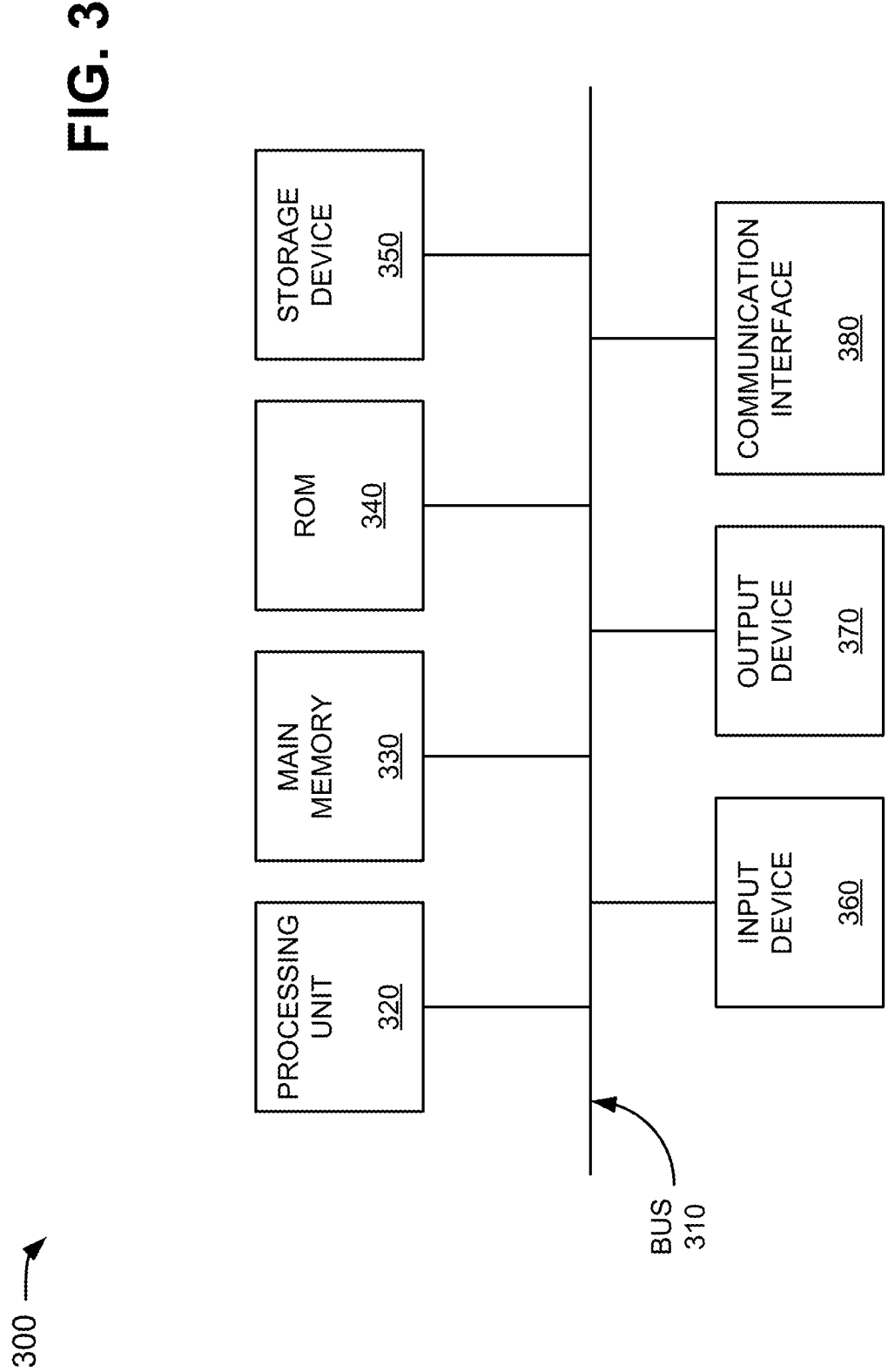
FIG. 3 is a diagram of example components of the user device, a provider device, and/or a content provider device illustrated in FIG. 1.

FIG. 3 is a diagram of example components of a device 300 that may correspond to user device 110 (e.g., if user device is a laptop computer or a personal computer), provider device 120, content provider device 140, and/or streamer device 150. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 170.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

Figure 4:
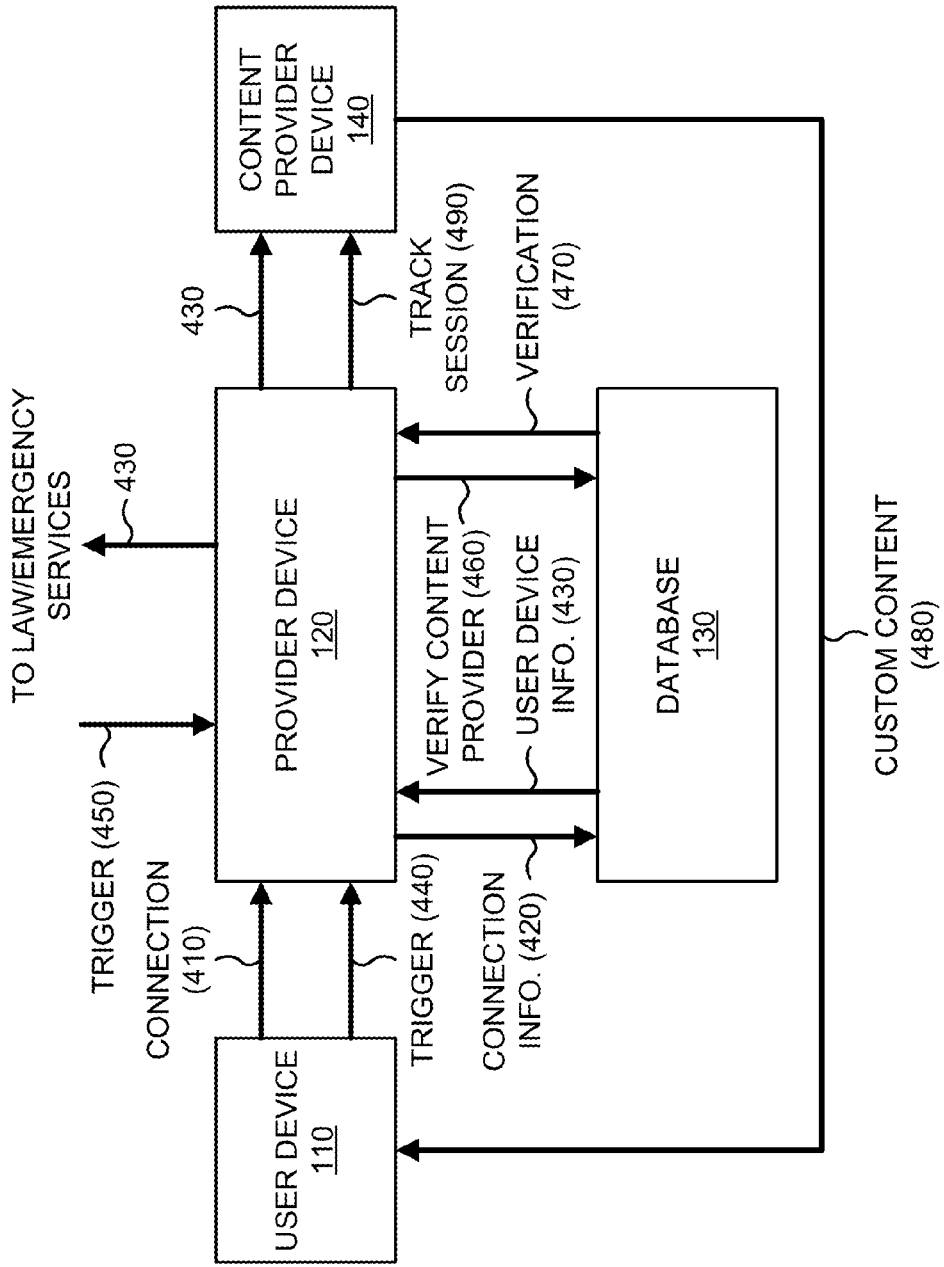
FIG. 4 is a diagram of example interactions among components of an example portion of the network depicted in FIG. 1.

FIG. 4 is a diagram of example interactions among components of an example portion 400 of network 100. As illustrated, example network portion 400 may include user device 110, provider device 120, database 130, and content provider device 140. User device 110, provider device 120, database 130, and content provider device 140 may include the features described above in connection with, for example, one or more of FIGS. 1-3.

As further shown in FIG. 4, user device 110 may connect to provider device 120, as shown by reference number 410. For example, if user device 110 is accessing a web site generated by provider device 120, user device 110 may connect to provider device 120 via a uniform resource locator (URL) associated with the web site. Provider device 120 may receive connection 410, and may provide connection information 420 to database 130. Connection 410 between user device 110 and provider device 120 may include a dedicated single logical or physical port connection per each customer (e.g., each user device 110), a shared access connection (e.g., a broadcast domain for a set of customers), a mobile or Wi-Fi connection, etc. Each of these connection types may have a different level of accuracy for a specific location, but other mechanisms (e.g., triangulation mechanisms, heartbeat/network time protocol (NTP)/round trip time (RTT) mechanisms, etc.) for increasing accuracy for shared and mobile customers may also be implemented.

Connection information 420 may include information associated with user device's 110 connection 410 with provider device 120. For example, connection information 420 may include network attachment point information or metadata (e.g., information about network devices of network 170 used to connect user device 110 to provider device 120) that may be initialized on deployment of provider device 120, user device 110 attachment point information or metadata that may be initialized on deployment of a service (e.g., a new service, a changed service, etc.) provided by provider device 120, etc. In one implementation, each device of network 100 may embed a location and/or other location-relevant metadata in selective datagrams. For example, connection 410 may include datagrams that embed location information (e.g., a geographical location, a zip code, etc.) associated with user device 110.

In response to connection 410 and/or connection information 420, provider device 120 may retrieve user device information 430 from database 130 (e.g., via a query or some other data retrieval mechanism). User device information 430 may include information (e.g., metadata) about user device 110, a user of user device 110, a connection point of user device 110 (e.g., to network 170), etc. For example, user device information 430 may include attachment point information (e.g., a connection point of user device 110 to network 170); a geographical location of user device 110; a zip code associated with user device 110; a speed (e.g., in gigabits per second) of user device 110; a type (e.g., a brand, a manufacturer, etc.) of user device 110; a timestamp associated with user device 110 (e.g., when user device 110 connects to provider device 120); congestion information associated with connection 410; a load (e.g., a bandwidth) associated with provider device 120; registration information (e.g., a user name, a user address, a user telephone number, etc.) associated with a user; other database 130 information (e.g., information about third party content providers, such as a content provider associated with content provider device 140); link performance information (e.g., a bandwidth or speed associated with a link connecting user device 110 and a network device); user device 110 capabilities (e.g., a screen size of user device 110, whether user device 110 can display high definition (HD) or three-dimensional (3D) content, etc.) as the capabilities relate to file formats and/or encoding methods for various players; player type information (e.g., a type of content player employed by user device 110); encoding information (e.g., encoding capable of being handled by user device 110); video format information (e.g., video format parameters employed by the player of user device 110); player file format information (e.g., combinations of encoding and video format parameters employed by user device 110); other measurements and/or characteristics associated with network 170; etc.

As further shown in FIG. 4, user device 110 may provide a trigger 440 to provider device 120 and/or another trigger 450 may be provided to provider device 120 (e.g., by content provider device 140 or other sources). Triggers 440/450 may be received by provider device 120, and may direct provider device 120 (e.g., via the postmark protocol associated with network 100) to provide user device information 430 to third parties, such as a third party content provider associated with content provider device 140. Triggers 440/450 may include network event-based triggers (e.g., a trigger for every packet, a trigger for every Transmission Control Protocol (TCP) open, a trigger for every TCP close, a port-based trigger, etc.), customer-specified triggers (e.g., a customer may want bandwidth specified for remote devices, such as content provider device 140), destination-specified triggers (e.g., content providers may wish to provide real-time localized content to user device 110), provider-specified triggers (e.g., provider device 120 may provide enhanced 911 (or "e911") emergency services), etc.

The postmark protocol (e.g., and provider device 120) may not convey user device information 430 to third parties until triggers 440/450 are received. If triggers 440/450 are not received by provider device 120, the transmission of information may occur only between a user (e.g., via user device 110) and a provider (e.g., via provider device 120). If triggers 440 or 450 are received by provider device 120, user device information 430 may be conveyed, by provider device 120, to authorized content providers (e.g., content provider device 140). Thus, the postmark protocol (e.g., and provider device 120) may not create any specialized privacy concerns for customers. Prior to providing user device information 430 to content provider device 140, provider device 120 may verify the content provider associated with content provider device 140, as indicated by reference number 460. For example, provider device 120 may search database 130 to determine whether the content provider is a subscriber to user device information 430 (e.g., a location service). Other security mechanisms may be used to verify the content provider, such a public key encryption mechanisms, private key encryption mechanisms, etc. If the content provider is verified, as indicated by reference number 470, provider device 120 may provide user device information 430 to content provider device 140.

In one example implementation, the postmark protocol may include a requirement to log in to provider device 120 (e.g., by the content provider) to verify and authenticate the content provider and to prevent anti-spoofing. The postmark protocol may be extended to replace or enhance other location identification services, such as the Internet control message protocol (ICMP) (e.g., the echo or ping protocol) and traceroute functionality.

As further shown in FIG. 4, if content provider device 140 receives user device information 430, content provider device 140 may provide custom content 480 to user device 110. Custom content 480 may include a variety of information customized based on user device information 430 (e.g., based on a location associated with user device 110). For example, custom content 480 may include advertisements or other content that is localized based on the location associated with user device 110; marketing information targeted to the location associated with user device 110 (e.g., content provider device 140 may determine marketing information based on demographic statistics calculated based on the locations of several user devices 110); content redirected to a local content provider based on the location associated with user device 110 (e.g., a network news request may be redirected to a local affiliate of the network news); restriction of financial transactions to the location associated with user device 110; prevention of illegal content delivery to the location associated with user device 110; etc. Further details of custom content 480 are provided below in connection with, for example, FIG. 8.

Provider device 120 may also provide user device information 430 to law enforcement services and/or emergency services (e.g., AMBER alert services, Child Abduction Emergency services, Emergency Alert System (EAS) services, weather advisory services, etc.). For example, law enforcement services and/or emergency services (e.g., e911 services) may utilize user device information 430 to make a quicker determination of a location of a user associated with user device 110. This may enable law enforcement services and/or emergency services to respond to emergencies (e.g., associated with the user) in a quicker manner. As further shown in FIG. 4, provider device 120 (e.g., via the postmark protocol) may track an establishment of a session between content provider device 140 and user device 110 (e.g., to provide custom content 480), as indicated by reference number 490. The tracking of the session between content provider device 140 and user device 110 may provide increased security for both the user of user device 110 and the content provider.

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400.

Figure 5:
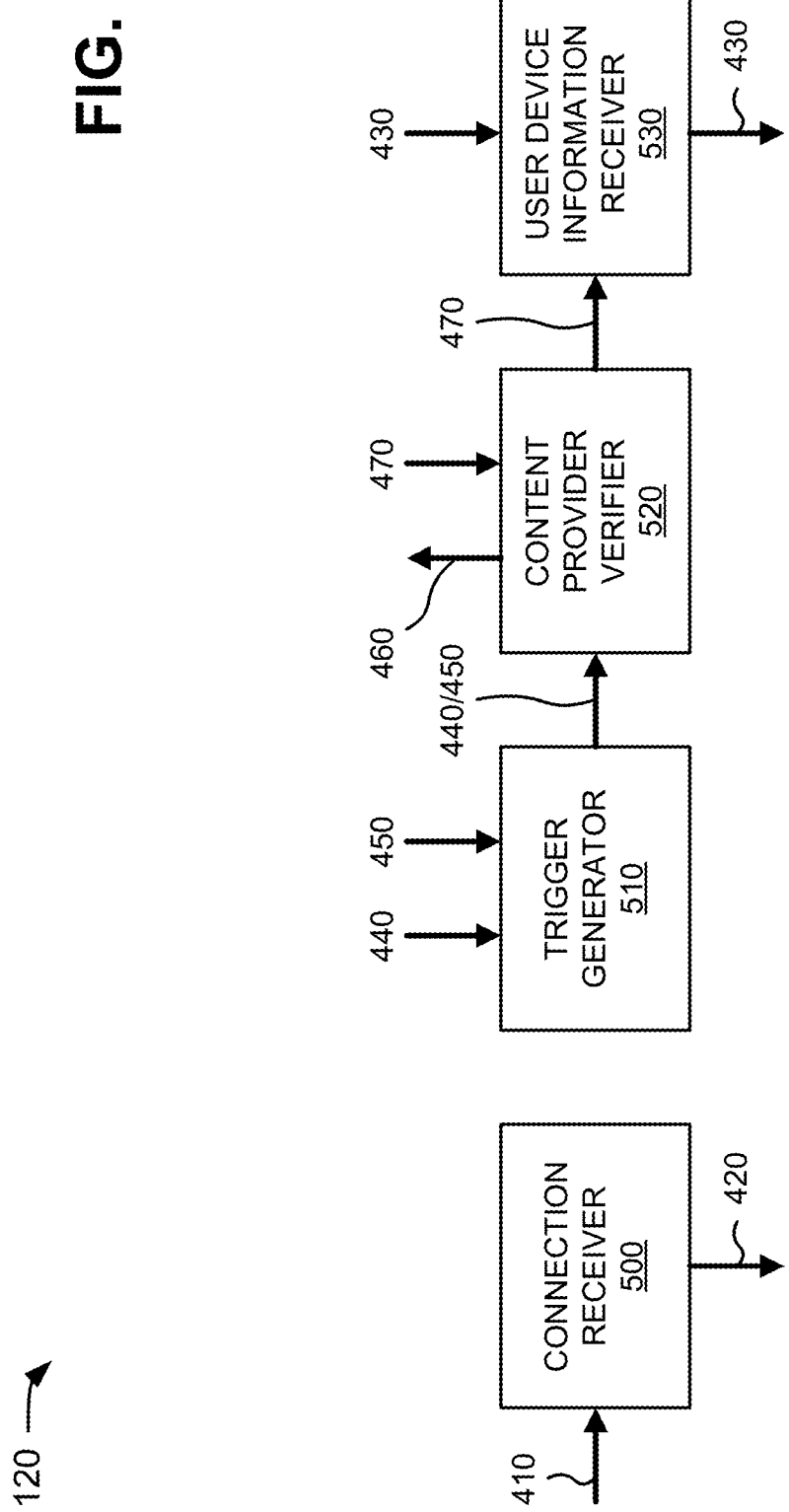
FIG. 5 is a diagram of example functional components of the provider device illustrated in FIG. 1.

FIG. 5 is a diagram of example functional components of provider device 120. In one implementation, the functions described in connection with FIG. 5 may be performed by one or more components of device 300 (FIG. 3). As shown in FIG. 5, provider device 120 may include a connection receiver 500, a trigger generator 510, a content provider verifier 520, and a user device information receiver 530.

Connection receiver 500 may include hardware or a combination of hardware and software that may receive connection 410 by user device 110 (e.g., with provider device 120), and may provide connection information 420 to database 130, as described above in connection with FIG. 4. Provider device 120 (e.g., user device information receiver 530) may receive, from database 130, user device information 430 in response to providing connection information 420 to database 130. In one implementation, connection information 420 may be used to perform a search (or query) of database 130 for user device information 430.

Trigger generator 510 may include hardware or a combination of hardware and software that may receive trigger 440 from user device 110, and may receive trigger 450 from content provider device 140 or other sources. Triggers 440/450 may instruct provider device 120 (e.g., trigger generator 510) to provide triggers 440/450 to content provider verifier 520 so that a content provider may be verified before receiving user device information 430.

Content provider verifier 520 may include hardware or a combination of hardware and software that may receive triggers 440/450 from trigger generator 510. Triggers 440/450 may instruct content provider verifier 520 to verify a content provider (e.g., as indicated by reference number 460) associated with content provider device 140. Content provider verifier 520 may perform a search (or query) of database 130 to determine whether the content provider is authorized to receive user device information 430. If the content provider is verified, content provider verifier 520 may receive verification 470 from database 130 and may provide verification 470 to user device information receiver 530.

User device information receiver 530 may include hardware or a combination of hardware and software that may receive verification 470 from content provider verifier 520. Verification 470 may indicate, to user device information receiver 530, that it is acceptable to provide user device information 430 to content provider device 140, and user device information receiver 530 may provide user device information 430 to content provider device 140.

Although FIG. 5 shows example functional components of provider device 120, in other implementations, provider device 120 may contain fewer functional components, different functional components, differently arranged functional components, or additional functional components than depicted in FIG. 5. Alternatively, or additionally, one or more functional components of provider device 120 may perform one or more other tasks described as being performed by one or more other functional components of provider device 120.

FIG. 6 is a diagram of an example portion 600 of database 130. As shown, database portion 600 may include a registration information field 610, a network/user device (UD) attachment point field 620, a user device type field 630, a user device speed field 640, a user device zip code field 650, a user device location field 660, a provider load field 670, an other information field 680, and/or a variety of entries 690 associated with fields 610-680.

Registration information field 610 may include registration information (e.g., a user name, a user address, a user telephone number, a password associated with a user, etc.) associated with users of user devices (e.g., user device 110) connected to network 170. For example, as shown in FIG. 6, registration information field 610 may include registration information associated with a first user (e.g., "User1"), a second user (e.g., "User2"), and a third user (e.g., "User3").

Network/UD attachment point field 620 may include information associated with a network attachment point and/or information associated with a user device attachment point. For example, network/UD attachment point field 620 may include an identifier for a network device (e.g., of network 170) connected to user device 110, an identifier for a network device connected to provider device 120, etc. As shown in FIG. 6, network/UD attachment point field 620 may include information associated with a first attachment point (e.g., "Attachment Point1"), a second attachment point (e.g., "Attachment Point2"), and a third attachment point (e.g., "Attachment Point3").

User device type field 630 may include information associated with types (e.g., a personal computer) of user devices 110 connected to network 170. For example, as shown in FIG. 6, user device type field 630 may include information identifying a user device 110 as a cell phone, a STB, a laptop computer, etc.

User device speed field 640 may include information associated with bandwidth or speeds (e.g., in gigabits per second) of user devices 110 connected to network 170. For example, as shown in FIG. 6, user device speed field 640 may include information associated with a first speed (e.g., "Speed1"), a second speed (e.g., "Speed2"), and a third speed (e.g., "Speed3").

User device zip code field 650 may include zip code information (e.g., postal zip codes) of user devices 110 connected to network 170. For example, as shown in FIG. 6, user device zip code field 650 may indicate that the cell phone (e.g., provided in user device type field 630) is located at zip code "99999," that the STB (e.g., provided in user device type field 630) is located at zip code "88888," and that the laptop computer (e.g., provided in user device type field 630) is located at zip code "77777."

User device location field 660 may include geographical location information (e.g., city, county, state, etc.) of user devices 110 connected to network 170. For example, as shown in FIG. 6, user device location field 660 may indicate that the cell phone (e.g., provided in user device type field 630) is located in "New York, N.Y.," that the STB (e.g., provided in user device type field 630) is located in "Philadelphia, Pa.," and that the laptop computer (e.g., provided in user device type field 630) is located in "Wilmington, Del."

Provider load field 670 may include information associated with a load (e.g., an amount of bandwidth currently in use between each device in network 100) capable of being handled by provider device 120 for the user device (e.g., provided in user device type field 630). A provider (e.g., provider device 120) may provide information associated with an amount of load provisioned for a customer, a current amount of load being used by a customer, and/or a remainder amount of load available. A load may be expressed as a percentage of a total provisioned load, a load indicated between each device in network 100, etc. For example, as shown in FIG. 6, provider load field 670 may include information associated with a first bandwidth (e.g., "Bandwidth1"), a second bandwidth (e.g., "Bandwidth2"), and a third bandwidth (e.g., "Bandwidth3").

Other information field 680 may include information associated with other measurements and/or characteristics of network 170.

Although FIG. 6 shows example information that may be provided in database portion 600, in other implementations, database portion 600 may contain less, different, differently arranged, or additional information than depicted in FIG. 6.

FIG. 7 is a diagram of example elements of a datagram 700 capable of being utilized in network 100. In one implementation, datagram 700 may be generated, transmitted, and/or received by one or more of user device 110, provider device 120, database 130, content provider device 140, streamer device 150, streamer cache 160, and/or network devices associated with network 170. The postmark protocol associated with network 100 may transmit one or more datagrams 700 to establish communications between different devices of network 100. As shown in FIG. 7, datagram 700 may include a network device identification (ID) element 705, a user device SIP element 710, and multiple type-length-value (TLV) structure elements 715.

Network device ID element 705 may include information identifying a device (e.g., provider device 120) associated with network 170. For example, network device ID element 705 may include an address (e.g., an IP address) or other location-relevant information of a device associated with network 170.

User device SIP element 710 may include information identifying user device 110. For example, user device SIP element 710 may include an address (e.g., an IP address) or other location-relevant information associated with user device 110.

Each of TLV elements 715 may include type and length fields that are fixed in size (e.g., one to four bytes) and a value field that is of variable size. The type field may include a numeric code that indicates a kind of field that this portion of TLV element 715 represents. The length field may include a size of the value field (e.g., in bytes). The value field may include a variable-sized set of bytes that contains data for this portion of TLV element 715. As further shown in FIG. 7, each of TLV elements 715 may include one or more of a registration data element 720, a network data element 725, a user device type element 730, a user device speed element 735, a zip code element 740, a provider load element 745, and a location/geocode element 750.

Registration data element 720 may include registration information (e.g., a user name, a user address, a user telephone number, a password associated with a user, etc.) associated with users of user devices (e.g., user device 110) connected to network 170. Network data element 725 may include information associated with a network attachment point and/or information associated with a user device attachment point. For example, network data element 725 may include an identifier for a network device (e.g., of network 170) connected to user device 110, an identifier for a network device connected to provider device 120, etc.

User device type element 730 may include information associated with types (e.g., a personal computer, a cell phone, a STB, a laptop computer, etc.) of user devices 110 connected to network 170. User device speed element 735 may include information associated with speeds (e.g., in gigabits per second) of user devices 110 connected to network 170. Zip code element 740 may include zip code information (e.g., postal zip codes) of user devices 110 connected to network 170.

Provider load element 745 may include information associated with a load (e.g., an amount of bandwidth currently in use between each device in network 100) capable of being handled by provider device 120 for user device 110. Location/geocode element 750 may include geographical location information (e.g., city, county, state, etc.) of user devices 110 connected to network 170.

Although FIG. 7 shows example information that may be provided in datagram 700, in other implementations, datagram 700 may contain less information, different information, differently arranged information, or additional information than depicted in FIG. 7.

FIG. 8 is a diagram of example content 800 that may be generated by content provider device 140. Content provider device 140 may include the features described above in connection with, for example, FIGS. 1 and 4.

As further shown in FIG. 8, if content provider device 140 receives user device information 430 (e.g., from provider device 120), content provider device 140 may generate custom content 480. Custom content 480 may include local advertisements (ads) 810, demographic statistics 820, localized content delivery 830, location sensitive content 840, e911 services information 850, financial transactions information 860, legal filtering information 870, and/or law enforcement information 880.

Local ads 810 may include advertisements specific to a geographic location associated with user device 110 (e.g., as determined from user device information 430). Local ads 810 may be provided at a neighborhood level (e.g., ads for neighborhood services) or a customer premises level. For example, local ads 810 may include information associated with homeowners association content, local firehouses, local police departments, local elections, etc. Local ads 810 may also include information associated a bandwidth (e.g., a high-bandwidth, a low-bandwidth, etc.) provided by provider device 120 (or content provider device 140), and congestion information associated with provider device 120 (or content provider device 140).

Demographic statistics 820 may include statistical information determined based on user device information 430. For example, demographics statistics 820 may include a number of web transactions (e.g., a number of webpage hits, a number of content hits, a number of sales, a number of click-through events, types of connections, etc.) per neighborhood, per town, etc. Demographic statistics 820 may be used (e.g., by other third parties) for distribution and warehousing of products, for brick-and-mortar expansion decisions, for determining and distributing targeted advertisements, etc.

Localized content delivery 830 may include content whose delivery may be redirected to a specific locale's content (e.g., a locale determined based on user device information 430). For example, if user device 110 is located in Atlanta, Ga. and requests network news content (e.g., from CNN), content provider device 140 may redirect the request to a local news service affiliated with CNN (e.g., to "atlanta.cnn.com"). In another example, if user device 110 is located in Arlington, Va. and requests the weather channel, content provider device 140 may redirect the request to a local weather affiliated with the weather channel (e.g., to "arlington.weather.com"). This may permit user device 110 to view weather-related warnings that are local to user device 110.

Location sensitive content 840 may include content specific to a geographic location associated with user device 110 (e.g., as determined from user device information 430). For example, location sensitive content may include movie, weather, traffic, business, etc. information specific to the geographic location associated with user device 110.

e911 services information 850 may include information (e.g., as determined from user device information 430) that enables user device 110 to receive e911 services.

Financial transactions information 860 may include information (e.g., as determined from user device information 430) that enables user device 110 to restrict financial transactions (e.g., credit cards, account inquiries, or other online transactions) to a specific geographic location associated with user device 110. When traveling, new geographic locations of user device 110 may be predetermined from a "home" location associated with user device 110. Financial transactions information 860 may reduce credit card theft by offering another layer of embedded authentication that may be difficult to spoof. For example, banks could use financial transactions information 860 for fraud detection.

Legal filtering information 870 may include information (e.g., as determined from user device information 430) that enables user device 110 to satisfy national or state legal requirements if the location of user device 110 is ascertained by content provider device 140 (or by network devices of network 170) to prohibit certain content. For example, if content from a national content provider is illegal in a particular state, legal filtering information 870 may prevent the national content provider from providing the content to the particular state.

Law enforcement information 880 may include information (e.g., as determined from user device information 430) that enables law enforcement to quickly determine a location of user device 110.

Although FIG. 8 shows example content 800 that may be generated by content provider device 140, in other implementations, content provider device 140 may generate less content, different content, differently arranged content, or additional content than depicted in FIG. 8.

Figure 9B:
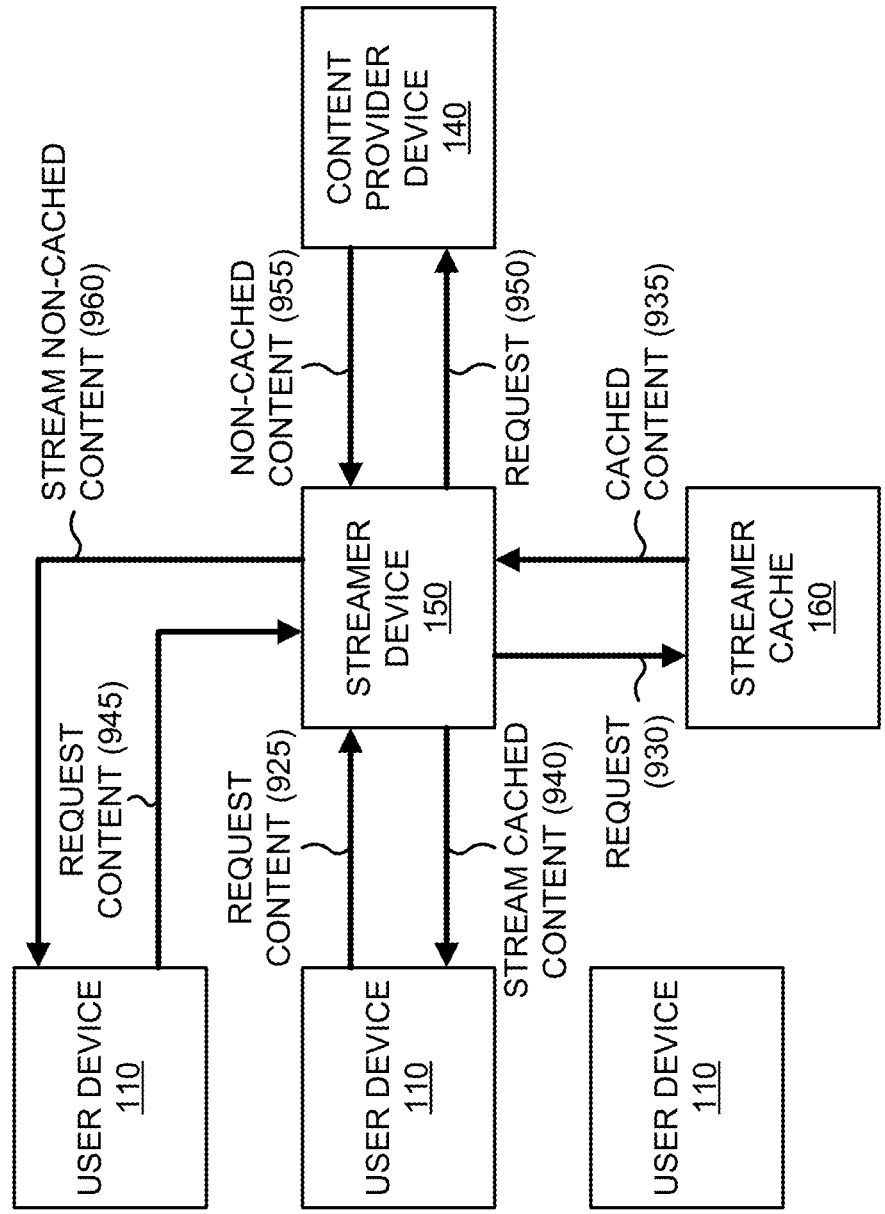

FIGS. 9A and 9B are diagrams of example interactions among components of another example portion 900 of network 100. As illustrated, example network portion 900 may include user devices 110, content provider device 140, streamer device 150, and streamer cache 160. User devices 110, content provider device 140, streamer device 150, and streamer cache 160 may include the features described above in connection with, for example, one or more of FIGS. 1-8.

As further shown in FIG. 9A, user devices 110 may generate subscriber information 905, and may provide subscriber information 905 to streamer device 150. Streamer device 150 may receive subscriber information 905. Subscriber information 905 may include names of subscribers associated with user devices 110, addresses of subscribers associated with user devices 110, demographics of subscribers associated with user devices 110, content interests of subscribers associated with user devices 110, etc. For example, subscriber information 905 may indicate that most subscribers in a particular area prefer content associated with sporting events, may indicate that most subscribers in another area prefer content associated with politics, may indicate that the most high definition video content is viewed during a particular time of day, etc.

Streamer device 150 may also receive user device information 430 (e.g., from provider device 120) and network information 910 (e.g., from network 170). User device information 430 may include the information described above in connection with FIG. 4. Network information 910 may include attachment point information associated with user devices 110 (e.g., connection point of user device 110 to network 170), bandwidth information associated with network 170, information about network devices of network 170, congestion information associated with network 170 (e.g., identifying congested portions of network 170), etc.

Streamer device 150 may store the received information in a database (e.g., in the database described below in connection with FIG. 11) provided in or maintained by streamer device 150. Streamer device 150 may utilize subscriber information 905, network information 910, and/or user device information 430 to determine which content (e.g., of content provider device 140) to edge cache (e.g., provide near user devices 110) in streamer cache 160. In one example, streamer device 150 may determine bit-rate encodings of content to store locally in streamer cache 160. For example, streamer device 150 may decide (e.g., based on information 430, 905, and/or 910) that content with the most common encoding and/or player formats (e.g., desired by customers) are to be edge cached (e.g., in streamer cache 160) near user devices 110, rather than content with the least desired encoding and/or player formats.

In one example implementation, streamer device 150 may use either subscriber self-identification or subscriber viewing statistics to edge cache content in streamer cache 160. The postmark protocol may help high-speed broadband subscribers to receive higher data rate content files because of the self-identification. The postmark protocol may circumvent the typical trial and error of bandwidth capabilities (e.g., TCP slow grow) and manually starting a content session at a higher format and having to adjust (in real time) when resource contention occurs somewhere in a path between streamer device 150 and user device 110 (e.g., including endpoints). Rather, the postmark protocol may enable a user device 110 to start at a correct bandwidth for a connection with network 170.

Streamer device 150 may request the determined content (e.g. determined based on information 430, 905, and/or 910) from content provider device 140, as indicated by reference number 915. Content provider device 140 may provide requested content 920 (e.g., requested by request 915) to streamer device 150, and streamer device 150 may receive requested content 920 from content provider device 140. Streamer device 150 may store requested content 920 in streamer cache 160. In one example, streamer device 150 may store (e.g., in streamer cache 160 and physically near user devices 110) content 920 with the most common encoding and/or player formats (e.g., desired by user devices 110). Such an arrangement may ensure that content 920 may be quickly and easily streamed to user devices 110 (e.g., without having to retrieve content 920 from content provider device 140).

As shown in FIG. 9B, streamer device 150 may receive a request 925 for content from a particular user device 110, and may determine if the requested content is in streamer cache 160 or at content provider device 140. For example, streamer device 150 may include an index of content cached in streamer cache 160, and may perform a search (or query) of the index to determine if the requested content is in streamer cache 160. In another example, the index may be provided in streamer cache 160, and streamer device 150 may perform a search (or query) of the index provided in streamer cache 160. If streamer device 150 determines that the requested content is in streamer cache 160, streamer device 150 may stream the requested content directly from streamer cache 150 to the particular user device 110. For example, streamer device 150 may provide a request 930 for the requested content to streamer cache 160, and streamer cache 160 may provide the requested cached content 935 to streamer device 150. Streamer device 150 may then stream cached content 935 to the particular user device 110, as indicated by reference number 940.

As further shown in FIG. 9B, streamer device 150 may receive a request 945 for content from another user device 110, and may determine if the requested content is in streamer cache 160 or at content provider device 140. In one example, streamer device 150 may perform a search (or query) of the index (e.g., of content provided in streamer cache 160) to determine if the requested content is in streamer cache 160. If the requested content does not appear in a search result of the index, streamer device 150 may determine that requested content is not in streamer cache 160, but rather is provided at content provider device 140. In another example, streamer cache 150 may perform a search (or query) of an index, of content provided in content provider device 140, to determine if the requested content is in content provider device 140. If the requested content is not in streamer cache 160, streamer device 150 may provide a request 950 for the requested content to content provider device 140, and content provider device 140 may provide the requested non-cached content 955 to streamer device 150. Streamer device 150 may then stream non-cached content 955 to the other user device 110, as indicated by reference number 960.

Although FIGS. 9A and 9B show example components of network portion 900, in other implementations, network portion 900 may contain fewer components, different components, differently arranged components, or additional components than depicted in FIGS. 9A and 9B. Alternatively, or additionally, one or more components of network portion 900 may perform one or more other tasks described as being performed by one or more other components of network portion 900.

FIG. 10 is a diagram of example functional components of streamer device 150. In one implementation, the functions described in connection with FIG. 10 may be performed by one or more components of device 300 (FIG. 3). As shown in FIG. 10, streamer device 150 may include a cache content requester 1000, a cache content forwarder 1010, a content determiner 1020, a cached content streamer 1030, and a non-cached content streamer 1040.

Cache content requester 1000 may include hardware or a combination of hardware and software that may receive user device information 430 (e.g., from provider device 120), subscriber information 905 (e.g., from user devices 110), and network information 910 (e.g., from network 170). Cache content requester 1000 may utilize subscriber information 905, network information 910, and/or user device information 430 to determine which content (e.g., of content provider device 140) to edge cache in streamer cache 160. Cache content requester 1000 may request the determined content (e.g. determined based on information 430, 905, and/or 910) from content provider device 140, as indicated by reference number 915.

Cache content forwarder 1010 may include hardware or a combination of hardware and software that may receive requested content 920 (e.g., based on request 915 generated by cache content requester 1000) from content provider device 140, and may forward requested content 920 to streamer cache 160 for storage.

Content determiner 1020 may include hardware or a combination of hardware and software that may receive request 925 for content from a particular user device 110, and may determine if the requested content is in streamer cache 160 or at content provider device 140. If content determiner 1020 determines that the requested content (e.g., of request 925) is in streamer cache 160, content determiner 1020 may provide request 925 to cached content streamer 1030. Content determiner 1020 may receive request 945 for content from another user device 110, and may determine if the requested content is in streamer cache 160 or at content provider device 140. If content determiner 1020 determines that the requested content (e.g., of request 945) is not in streamer cache 160, content determiner 1020 may provide request 945 to non-cached content streamer 1040.

Cached content streamer 1030 may include hardware or a combination of hardware and software that may receive request 925 from content determiner 1020, and may provide request 930 for the requested content to streamer cache 160. Streamer cache 160 may provide the requested cached content 935 to cached content streamer 1030, and cached content streamer 1030 may receive cached content 935. Cached content streamer 1030 may then stream cached content 935 to the particular user device 110, as indicated by reference number 940.

Non-cached content streamer 1040 may include hardware or a combination of hardware and software that may receive request 945 from content determiner 1020, and may provide request 950 for the requested content to content provider device 140. Content provider device 140 may provide the requested non-cached content 955 to non-cached content streamer 1040, and non-cached content streamer 1040 may receive non-cached content 955. Non-cached content streamer 1040 may then stream non-cached content 955 to the other user device 110, as indicated by reference number 960.

Although FIG. 10 shows example functional components of streamer device 150, in other implementations, streamer device 150 may contain fewer functional components, different functional components, differently arranged functional components, or additional functional components than depicted in FIG. 10. Alternatively, or additionally, one or more functional components of streamer device 150 may perform one or more other tasks described as being performed by one or more other functional components of streamer device 150.

FIG. 11 is a diagram of an example portion 1100 of a database capable of being generated and/or maintained by streamer device 150. As shown, database portion 1100 may include a subscriber information field 1110, a subscriber interests field 1120, a link performance field 1130, a user device capabilities field 1140, a player type field 1150, an encoding field 1160, a video format field 1170, a player file format field 1180, and/or a variety of entries 1190 associated with fields 1110-1180.

Subscriber information field 1110 may include subscriber information (e.g., a subscriber name, a subscriber address, a subscriber telephone number, a password associated with a subscriber, etc.) associated with subscribers of user devices (e.g., user device 110) connected to network 170. For example, as shown in FIG. 11, subscriber information field 1110 may include a name associated with a first subscriber (e.g., "Name"), demographics associated with a second subscriber (e.g., "Demo."), and an address associated with a third subscriber (e.g., "Address").

Subscriber interests field 1120 may include content interests of subscribers associated with user devices 110. For example, as shown in FIG. 11, subscriber interests field 1120 may indicate that the first subscriber is interested in video content (e.g., "Action Movies"), that the second subscriber is interested in audio content (e.g., "Rock Music"), and that the third subscriber is interested in television content (e.g., "Educational Television").

Link performance field 1130 may include information associated with links connecting user devices 110 to network 170. For example, link performance field 1130 may include a bandwidth or speed associated with a link connecting user device 110 and a network device. As shown in FIG. 11, link performance field 1130 may include bandwidth information associated with a link to the first subscriber's user device 110 (e.g., "B/W"), speed information associated with a link to the second subscriber's user device 110 (e.g., "Speed1"), and speed information associated with a link to the third subscriber's user device 110 (e.g., "Speed2").

User device capabilities field 1140 may include information associated with capabilities of user devices 110 as related to file formats and/or encoding methods for various players (e.g., of user devices 110). For example, as shown in FIG. 11, user device capabilities field 1140 may indicate that the first subscriber's user device 110 can display high definition content (e.g., "HD"), that the second subscriber's user device 110 has a particular screen size (e.g., "Screen size"), and that the third subscriber's user device 110 can display three-dimensional content (e.g., "3D").

Player type field 1150 may include types of content players provided in user devices 110. For example, as shown in FIG. 11, player type field 1150 may indicate that the first subscriber's user device 110 uses a first type of content player (e.g., "Player Type1"), that the second subscriber's user device 110 uses a second type of content player (e.g., "Player Type2"), and that the third subscriber's user device 110 uses a third type of content player (e.g., "Player Type3").

Encoding field 1160 may include encoding (e.g., MPEG, MP3, WMV, etc.) capable of being handled by user devices 110. For example, as shown in FIG. 11, encoding field 1160 may indicate that the first subscriber's user device 110 is capable of handling a type of video encoding (e.g., "MPEG"), that the second subscriber's user device 110 is capable of handling another type of video encoding (e.g., "WMV"), and that the third subscriber's user device 110 is capable of handling audio encoding (e.g., "MP3").

Video format field 1170 may include video format parameters employed by the players of user devices 110. For example, as shown in FIG. 11, video format field 1170 may indicate that the first subscriber's user device 110 has a player with a particular resolution (e.g., "Resolution"), that the second subscriber's user device 110 has a player with a particular bit rate (e.g., "bit rate"), and that the third subscriber's user device 110 has a player with a particular color mode (e.g., "Color model").

Player file format field 1180 may include information associated with player file formats (e.g., combinations of encoding and video format parameters) employed by user devices 110. For example, as shown in FIG. 11, player file format field 1180 may indicate the first subscriber's user device 110 uses an MP3 player file format (e.g., "iPod"), that the second subscriber's user device 110 uses a gaming console player file format (e.g., "PS3"), and that the third subscriber's user device 110 uses a smart phone player file format (e.g., "DROID," Android version 2.1, etc.).

Although FIG. 11 shows example information that may be provided in database portion 1100, in other implementations, database portion 1100 may contain less, different, differently arranged, or additional information than depicted in FIG. 11.

FIG. 12 is a diagram of example elements of another datagram 1200 capable of being utilized in network 100. In one implementation, datagram 1200 may be generated, transmitted, and/or received by one or more of user device 110, provider device 120, database 130, content provider device 140, streamer device 150, streamer cache 160, and/or network devices associated with network 170. In another implementation, datagram 1200 may be combined with datagram 700 (FIG. 7). The postmark protocol associated with network 100 may transmit one or more datagrams 1200 to establish communications between different devices of network 100. As shown in FIG. 12, datagram 1200 may include a network device ID element 1205, a user device SIP element 1210, and multiple TLV structure elements 1215.

Network device ID element 1205 may include information identifying a device (e.g., streamer device 150) associated with network 170. For example, network device ID element 1205 may include an address (e.g., an IP address) or other location-relevant information of a device associated with network 170.

User device SIP element 1210 may include information identifying user device 110. For example, user device SIP element 1210 may include an address (e.g., an IP address) or other location-relevant information associated with user device 110.

Each of TLV elements 1215 may include type and length fields that are fixed in size (e.g., one to four bytes) and a value field that is of variable size. The type field may include a numeric code that indicates a kind of field that this portion of TLV element 1215 represents. The length field may include a size of the value field (e.g., in bytes). The value field may include a variable-sized set of bytes that contains data for this portion of TLV element 1215. As further shown in FIG. 12, each of TLV elements 1215 may include one or more of a subscriber information element 1220, a subscriber interests element 1225, a link performance element 1230, a user device capabilities element 1235, a player type element 1240, a content encoding element 1245, a video format element 1250, and a player file format element 1255.

Subscriber information element 1220 may include subscriber information (e.g., a subscriber name, a subscriber address, a subscriber telephone number, a password associated with a subscriber, etc.) associated with subscribers of user devices (e.g., user device 110) connected to network 170. Subscriber interests element 1225 may include content interests (e.g., types of content, genres of content, etc.) of subscribers associated with user devices 110.

Link performance element 1230 may include information (e.g., bandwidth or speed) associated with links connecting user devices 110 to network 170 (or to devices of network 100). User device capabilities element 1235 may include information associated with capabilities (e.g., screen size, content handling capabilities, etc.) of user devices 110 connected to network 170. Player type element 1240 may include types of content players provided in user devices 110 connected to network 170.

Content encoding element 1245 may include information associated with encoding (e.g., MPEG, MP3, WMV, etc.) capable of being handled by user devices 110 connected to network 170. Video format element 1250 may include video format parameters (e.g., resolution, bit rate, color model, etc.) employed by the players of user devices 110 connected to network 170. Player file format element 1255 may include information associated with player file formats (e.g., combinations of encoding and video format parameters) employed by user devices 110 connected to network 170.

Although FIG. 12 shows example information that may be provided in datagram 1200, in other implementations, datagram 1200 may contain less information, different information, differently arranged information, or additional information than depicted in FIG. 12.

FIGS. 13A-16 are flow charts of an example process 1300 for providing content awareness caching according to implementations described herein. In one example implementation, process 1300 may be performed by streamer device 150. In other implementations, some or all of process 1300 may be performed by another device or group of devices (e.g., communicating with streamer device 150), such as streamer cache 160.

Figure 13A:
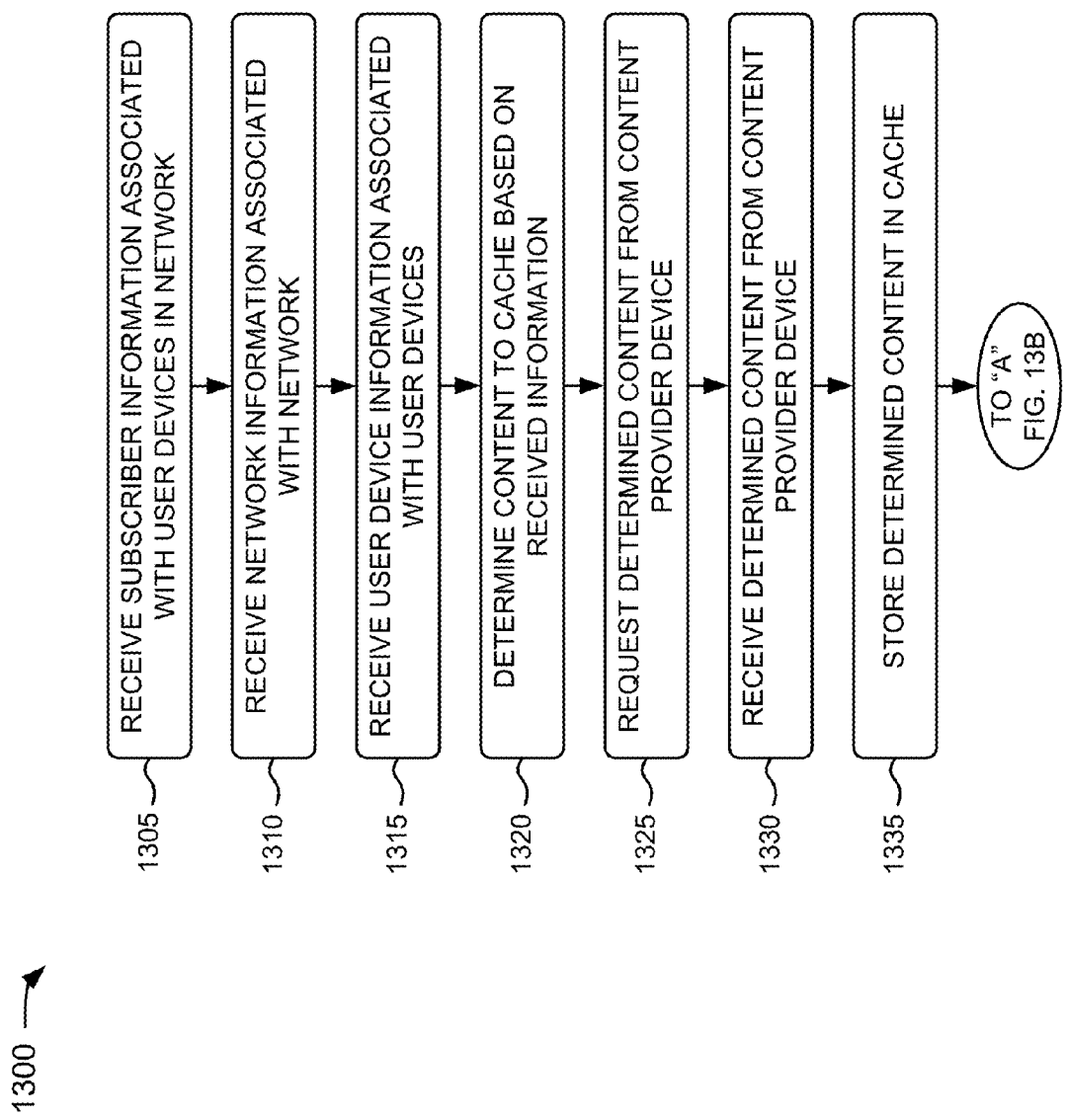

As illustrated in FIG. 13A, process 1300 may include receiving subscriber information associated with user devices of a network (block 1305), receiving network information associated with network (block 1310), and receiving user device information associated with the user devices (block 1315). For example, in implementations described above in connection with FIG. 9A, user devices 110 may generate subscriber information 905, and may provide subscriber information 905 to streamer device 150. Streamer device 150 may receive subscriber information 905. Subscriber information 905 may include names of subscribers associated with user devices 110, addresses of subscribers associated with user devices 110, demographics of subscribers associated with user devices 110, content interests of subscribers associated with user devices 110, etc. Streamer device 150 may also receive user device information 430 (e.g., from provider device 120) and network information 910 (e.g., from network 170). User device information 430 may include the information described above in connection with FIG. 4. Network information 910 may include attachment point information associated with user devices 110 (e.g., connection point of user device 110 to network 170), bandwidth information associated with network 170, information about network devices of network 170, congestion information associated with network 170 (e.g., identifying congested portions of network 170), etc.

As further shown in FIG. 13A, process 1300 may include determining content to cache based on the received information (block 1320). For example, in implementations described above in connection with FIG. 9A, streamer device 150 may utilize subscriber information 905, network information 910, and/or user device information 430 to determine which content (e.g., of content provider device 140) to edge cache in streamer cache 160. In one example, streamer device 150 may determine bit-rate encodings of content to store locally in streamer cache 160. In another example, streamer device 150 may decide (e.g., based on information 430, 905, and/or 910) that content with the most common encoding and/or player formats (e.g., desired by customers) are to be edge cached (e.g., in streamer cache 160) near user devices 110, rather than content with the least desired encoding and/or player formats. Streamer device 150 may use either subscriber self-identification or subscriber viewing statistics to edge cache content in streamer cache 160. The postmark protocol may help high-speed broadband subscribers to receive higher data rate content files because of the self-identification.

Returning to FIG. 13A, process 1300 may include requesting the determined content from a content provider device (block 1325), receiving the determined content from the content provider device (block 1330), and storing the determined content in a cache (block 1335). For example, in implementations described above in connection with FIG. 9A, streamer device 150 may request the determined content (e.g. determined based on information 430, 905, and/or 910) from content provider device 140, as indicated by reference number 915. Content provider device 140 may provide requested content 920 (e.g., requested by request 915) to streamer device 150, and streamer device 150 may receive requested content 920 from content provider device 140. Streamer device 150 may store requested content 920 in streamer cache 160. In one example, streamer device 150 may store (e.g., in streamer cache 160 and physically near user devices 110) content 920 with the most common encoding and/or player formats (e.g., desired by user devices 110).

As shown in FIG. 13B, process 1300 may include receiving a request for content from a particular user device (block 1340), and determining if the requested content is provided in the cache or the content provider device (block 1345). For example, in implementations described above in connection with FIG. 9B, streamer device 150 may receive request 925 for content from a particular user device 110, and may determine if the requested content is in streamer cache 160 or at content provider device 140. In one example, streamer device 150 may include an index of content cached in streamer cache 160, and may perform a search (or query) of the index to determine if the requested content is in streamer cache 160. In another example, the index may be provided in streamer cache 160, and streamer device 150 may perform a search (or query) of the index provided in streamer cache 160.

As further shown in FIG. 13B, if the requested content is provided in the cache (block 1345—CACHE), process 1300 may include streaming the requested content directly from the cache to the particular user device (block 1350). For example, in implementations described above in connection with FIG. 9B, if streamer device 150 determines that the requested content is in streamer cache 160, streamer device 150 may stream the requested content directly from streamer cache 150 to the particular user device 110. In one example, streamer device 150 may provide request 930 for the requested content to streamer cache 160, and streamer cache 160 may provide the requested cached content 935 to streamer device 150. Streamer device 150 may then stream cached content 935 to the particular user device 110, as indicated by reference number 940.

Returning to FIG. 13B, if the requested content is provided in the content provider device (block 1345—CONTENT PROVIDER), process 1300 may include retrieving the requested content from the content provider device (block 1355), and streaming the retrieved and requested content to the particular user device (block 1360). For example, in implementations described above in connection with FIG. 9B, if the requested content is not in streamer cache 160, streamer device 150 may provide request 950 for the requested content to content provider device 140, and content provider device 140 may provide the requested non-cached content 955 to streamer device 150. Streamer device 150 may then stream non-cached content 955 to the other user device 110, as indicated by reference number 960.

Process block 1305 may include the process blocks depicted in FIG. 14. As shown in FIG. 14, process block 1305 may include one or more of receiving names of subscribers associated with the user devices (block 1400), receiving addresses of subscribers associated with the user devices (block 1410), receiving demographics of subscribers associated with the user devices (block 1420), and receiving content interests of subscribers associated with the user devices (block 1430). For example, in implementations described above in connection with FIG. 9A, subscriber information 905 may include names of subscribers associated with user devices 110, addresses of subscribers associated with user devices 110, demographics of subscribers associated with user devices 110, content interests of subscribers associated with user devices 110, etc. In one example, subscriber information 905 may indicate that most subscribers in a particular area prefer content associated with sporting events, may indicate that most subscribers in another area prefer content associated with politics, may indicate that the most high definition video content is viewed during a particular time of day, etc.

Process block 1310 may include the process blocks depicted in FIG. 15. As shown in FIG. 15, process block 1310 may include one or more of receiving attachment point information associated with the user devices (block 1500), receiving bandwidth information associated with the network (block 1510), receiving information about network devices of the network (block 1520), and receiving congestion information associated with the network (block 1530). For example, in implementations described above in connection with FIG. 9A, network information 910 may include attachment point information associated with user devices 110 (e.g., connection point of user device 110 to network 170), bandwidth information associated with network 170, information about network devices of network 170, congestion information associated with network 170 (e.g., identifying congested portions of network 170), etc.

Process block 1315 may include the process blocks depicted in FIG. 16. As shown in FIG. 16, process block 1315 may include one or more of receiving link performance information associated with the user devices (block 1600), receiving capabilities associated with the user devices (block 1610), receiving player type information associated with the user devices (block 1620), receiving encoding information associated with the user devices (block 1630), receiving video format information associated with the user devices (block 1640), and receiving player file format information associated with the user devices (block 1650).

For example, in implementations described above in connection with FIG. 4, user device information 430 may include link performance information (e.g., a bandwidth or speed associated with a link connecting user device 110 and a network device); user device 110 capabilities (e.g., a screen size of user device 110, whether user device 110 can display high definition (HD) or three-dimensional (3D) content, etc.) as the capabilities relate to file formats and/or encoding methods for various players; player type information (e.g., a type of content player employed by user device 110); encoding information (e.g., encoding capable of being handled by user device 110); video format information (e.g., video format parameters employed by the player of user device 110); player file format information (e.g., combinations of encoding and video format parameters employed by user device 110); other measurements and/or characteristics associated with network 170; etc.

Systems and/or methods described herein may provide content awareness caching with a network-aware geo-location protocol (e.g., referred to herein as a "postmark protocol"). The systems and/or methods may determine which portions of content should be stored in a cache (e.g., physically located near customer user devices, such as mobile telephones, STBs, etc.), and may prevent distributing or streaming high rate encoded content on congested portions of a network. The systems and/or methods may provide an intelligent method for caching content so that content with the most common encoding and/or player formats (e.g., desired by customers) are cached near user devices, rather than content with the least desired encoding and/or player formats.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13A-16, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device, subscriber information associated with user devices coupled to a network, the subscriber information related to subscribers associated with the user devices;
   receiving, by the computing device, network information associated with the network, wherein the network information comprises:
      attachment point information associated with the user devices, wherein the attachment point information includes information about one or more network devices used to connect each of the user devices to the network,
      bandwidth information associated with the network, wherein the bandwidth information includes an amount of bandwidth provisioned for each of the subscribers, a current bandwidth being used by each of the subscribers, or an amount of bandwidth available to each of the subscribers in the network, and
      congestion information that identifies congested areas of the network;
   receiving, by the computing device, user device information associated with the user devices;
   determining, by the computing device, which items of content, of multiple items of content stored by a content provider device, to cache in a cache device physically located near the user devices based on the network information comprising the attachment point information, the bandwidth information and the congestion information, and further based on the subscriber information or the user device information;
   requesting, by the computing device, the determined items of content from the content provider device;
   receiving, by the computing device, the determined items of content from the content provider device; and
   storing, by the computing device, the determined content in the cache device physically located near the user devices.

2. The method of claim 1, further comprising:
   storing the network information, and the subscriber information or the user device information.

3. The method of claim 1, wherein receiving the subscriber information comprises one or more of:
   receiving names of the subscribers associated with the user devices,
   receiving addresses of the subscribers associated with the user devices,
   receiving demographics of the subscribers associated with the user devices, or
   receiving content interests of the subscribers associated with the user devices.

4. The method of claim 1, wherein receiving user device information comprises one or more of:
   receiving link performance information associated with the user devices,
   receiving capabilities associated with the user devices,
   receiving player type information associated with the user devices,
   receiving encoding information associated with the user devices,
   receiving video format information associated with the user devices, or
   receiving player file format information associated with the user devices.

5. The method of claim 1, further comprising:
   receiving a request for an item of content from a particular user device of the user devices;
   determining whether the requested item of content is stored in the cache device or the content provider device; and
   streaming, when the requested item of content is stored in the cache device, the requested item of content directly from the cache device to the particular user device.

6. The method of claim 5, further comprising:
   retrieving, when the requested item of content is stored in the content provider device, the requested item of content from the content provider device; and
   streaming the requested item of content, retrieved from the content provider device, to the particular user device.

7. The method of claim 5, where the computing device includes an index of content provided in the cache device, and where determining whether the requested item of content is stored in the cache device or the content provider device comprises:
   performing a search of the index to determine whether the requested item of content is stored in the cache device;
   determining that the requested item of content is stored in the cache device when the search provides a search result; and determining that the requested item of content is stored in the content provider device when the search does not provide a search result.

8. The method of claim 1, wherein the computing device comprises a streamer device that transmits content in an active stream that does not require a complete file download in order to play the content.

9. A device, comprising:
a memory configured to store a plurality of instructions; and
a processor configured to execute instructions in the memory to:
receive subscriber information associated with user devices provided in a network, the subscriber information related to subscribers associated with the user devices,
receive network information associated with the network, wherein the network information comprises:
attachment point information associated with the user devices, wherein the attachment point information includes information about one or more network devices used to connect each of the user devices to the network,
bandwidth information associated with the network, wherein the bandwidth information includes an amount of bandwidth provisioned for each of the subscribers, a current bandwidth being used by each of the subscribers, or an amount of bandwidth available to each of the subscribers in the network, and
congestion information that identifies congested areas of the network;
store the subscriber information and the network information,
determine which items of content, of multiple items of content stored by a content provider device, to cache in a cache device physically located near the user devices based on the subscriber information and the network information comprising the attachment point information, the bandwidth information and the congestion information,
request the determined items of content from the content provider device,
receive the determined items of content from the content provider device, and
store the determined items of content in the cache device physically located near the user devices.

10. The device of claim 9, wherein the subscriber information comprises one or more names of the subscribers, addresses of the subscribers, demographics of the subscribers, or content interests of the subscribers.

11. The device of claim 9, wherein the processor is further configured to execute instructions in the memory to:
receive a request for an item of content from a particular user device of the user devices,
determine whether the requested item of content is stored in the cache device or the content provider device, and
stream, when the requested item of content is stored in the cache device, the requested item of content directly from the cache device to the particular user device.

12. The device of claim 11, wherein the processor is further configured to execute instructions in the memory to:
retrieve, when the requested item of content is stored in the content provider device, the requested item of content from the content provider device, and
stream the requested item of content, retrieved from the content provider device, to the particular user device.

13. The device of claim 11, wherein the device includes an index of content stored in the cache device, and wherein, when determining whether the requested content is stored in the cache device or the content provider device, the processor is further configured to execute instructions in the memory to:
perform a search of the index to determine whether the requested item of content is stored in the cache device,
determine that the requested item of content is stored in the cache device when the search provides a search result, and
determine that the requested item of content is stored in the content provider device when the search does not provide a search result.

14. One or more non-transitory computer-readable media storing instructions executable by one or more processors provided in a device, the media storing one or more instructions for:
receiving subscriber information associated with user devices coupled to a network, the subscriber information related to subscribers associated with the user devices;
receiving network information associated with the network, wherein the network information comprises:
attachment point information associated with the user devices, wherein the attachment point information includes information about one or more network devices used to connect each of the user devices to the network,
bandwidth information associated with the network, wherein the bandwidth information includes an amount of bandwidth provisioned for a subscriber associated with each of the user devices, a current bandwidth being used by the subscriber, or an amount of bandwidth available to the subscriber in the network, and
congestion information that identifies congested areas of the network;
determining which items of content, of multiple items of content stored by a content provider device, to cache in a cache device physically located near the user devices based on the subscriber information and the network information comprising the attachment point information, the bandwidth information and the congestion information;
requesting and receiving the determined items of content from the content provider device;
storing the determined items of content in the cache device physically located near the user devices;
receiving a request for an item of content from a particular user device of the user devices; and
streaming the requested item of content directly from the cache device to the particular user device.

15. The media of claim 14, further storing one or more instructions for:
retrieving, when the requested item of content is stored in the content provider device, the requested item of content from the content provider device; and
streaming the requested item of content, retrieved from the content provider device, to the particular user device.

16. The media of claim 15, wherein the device includes an index of content stored in the cache device, and wherein the one or more instructions for determining whether the requested item of content is stored in the cache device or the content provider device further comprise one or more instructions for:
performing a search of the index to determine whether the requested item of content is in the cache device;

determining that the requested item of content is stored in the cache device when the search provides a search result; and determining that the requested item of content is stored in the content provider device when the search does not provide a search result.

17. The media of claim 14, wherein the subscriber information comprises one or more of:

names of subscribers associated with the user devices, addresses of the subscribers associated with the user devices, demographics of the subscribers associated with the user devices, or content interests of the subscribers associated with the user devices.

18. The media of claim 14, the media further storing one or more instructions for:

receiving user device information associated with the user devices, wherein the user device information comprises one or more of:

link performance information associated with the user devices, capabilities associated with the user devices, player type information associated with the user devices, encoding information associated with the user devices, video format information associated with the user devices, or player file format information associated with the user devices, wherein the determining which items of the content to cache is further based on the user device information.

* * * * *